US012367438B2

(12) United States Patent
Grant et al.

(10) Patent No.: US 12,367,438 B2
(45) Date of Patent: Jul. 22, 2025

(54) PARALLELIZED AND MODULAR PLANNING SYSTEMS AND METHODS FOR ORCHESTRATED CONTROL OF DIFFERENT ACTORS

(71) Applicant: inVia Robotics, Inc., Westlake Village, CA (US)

(72) Inventors: William Shane Simpson Grant, Van Nuys, CA (US); Joseph Traverso, Simi Valley, CA (US); Randolph Charles Voorhies, Sherman Oaks, CA (US); Lior Elazary, Agoura Hills, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 820 days.

(21) Appl. No.: 17/095,303

(22) Filed: Nov. 11, 2020

(65) Prior Publication Data
US 2022/0147385 A1     May 12, 2022

(51) Int. Cl.
*G06F 9/46* (2006.01)
*G06Q 10/047* (2023.01)
*G06Q 10/0631* (2023.01)

(52) U.S. Cl.
CPC ..... *G06Q 10/06312* (2013.01); *G06Q 10/047* (2013.01)

(58) Field of Classification Search
CPC .... G06F 9/4881; G06F 9/3897; G06F 9/5038; G06Q 10/06312; G06Q 10/047; G06Q 10/087; G06Q 50/28; G06Q 10/08
See application file for complete search history.

(56) References Cited

U.S. PATENT DOCUMENTS 10,134,006 B2 *  11/2018  Pandya ............ G05B 19/41895
10,504,147 B1 *  12/2019  Johnson ............. G06Q 30/0257
(Continued)

FOREIGN PATENT DOCUMENTS

CA     3076533 A1 *  3/2019  ............ B25J 9/1666
CA     2972999 C  *  9/2020  ............ B65G 1/1373
(Continued)

OTHER PUBLICATIONS

Lee, Carman KM, et al. "Smart robotic mobile fulfillment system with dynamic conflict-free strategies considering cyber-physical integration." Advanced Engineering Informatics 42 (2019): 100998. (Year: 2019).*
(Continued)

*Primary Examiner* — Thomas Yih Ho
(74) *Attorney, Agent, or Firm* — Ansari Katiraei LLP; Arman Katiraei; Sadiq Ansari

(57) ABSTRACT

Provided is a parallelized and modular planning system that controls multiple actors in performing different tasks simultaneously without conflict based on plans that are modularly created and/or updated. The system may update different parts of different plans at the same time without redefining those plans anew. The system may include a first subsystem that generates a first plan based on an assignment of a first task to a first actor, while a second subsystem provides a path for a second plan assigned to a second actor, while a third subsystem determines access ordering by which a third actor accesses a first resource from a path of a third plan, and while a fourth subsystem controls operation of a fourth actor in accessing a second resource from a path of a fourth plan based on an access ordering determined for the second resource by the third subsystem.

17 Claims, 11 Drawing Sheets

(56) References Cited

U.S. PATENT DOCUMENTS

| | | | | |
|---|---|---|---|---|
| 11,216,009 | B2* | 1/2022 | Dupuis | G06Q 10/047 |
| 2017/0327247 | A1* | 11/2017 | Dike | G05B 19/41865 |
| 2018/0182054 | A1* | 6/2018 | Yao | G06Q 50/28 |
| 2018/0229367 | A1* | 8/2018 | Lee | G06F 9/544 |
| 2018/0364719 | A1* | 12/2018 | Wang | G06F 16/22 |
| 2019/0049975 | A1* | 2/2019 | Kattepur | G05B 19/41865 |
| 2019/0138978 | A1* | 5/2019 | Johnson | G06Q 10/08 |
| 2019/0176328 | A1* | 6/2019 | Kichkaylo | G05D 1/0231 |
| 2019/0391597 | A1* | 12/2019 | Dupuis | B25J 9/0084 |
| 2020/0033867 | A1* | 1/2020 | Grant | G05D 1/0291 |
| 2020/0103921 | A1* | 4/2020 | Voorhies | G05D 1/0217 |
| 2020/0150687 | A1* | 5/2020 | Halder | G05D 1/648 |
| 2020/0202285 | A1* | 6/2020 | Elazary | G06F 9/4806 |
| 2020/0262650 | A1* | 8/2020 | Agarwal | B65G 1/1373 |
| 2020/0398428 | A1* | 12/2020 | Murray | B25J 9/1605 |
| 2021/0094176 | A1* | 4/2021 | Rusanu | G06F 9/485 |

FOREIGN PATENT DOCUMENTS

| | | | | |
|---|---|---|---|---|
| CN | 108694544 A | * | 10/2018 | G06Q 10/06312 |
| EP | 3591487 A1 | * | 1/2020 | G05B 19/4155 |

OTHER PUBLICATIONS

Wagner, Glenn, and Howie Choset. "Subdimensional expansion for multirobot path planning." Artificial intelligence 219 (2015): 1-24. (Year: 2015).*

Sabattini, Lorenzo, et al. "Optimized simultaneous conflict-free task assignment and path planning for multi-AGV systems." 2017 IEEE/RSJ International Conference on Intelligent Robots and Systems (IROS). IEEE, 2017. (Year: 2017).*

Han, Shuai D., and Jingjin Yu. "Ddm: Fast near-optimal multi-robot path planning using diversified-path and optimal sub-problem solution database heuristics." IEEE Robotics and Automation Letters 5.2 (2020): 1350-1357. (Year: 2020).*

Selvam, Praveen Kumar, et al. "Collision-free path planning for UAVs using efficient artificial potential field algorithm." 2021 IEEE 93rd Vehicular Technology Conference (VTC2021—Spring). IEEE, 2021. (Year: 2021).*

Azarm, Kianoush, and Günther Schmidt. "Conflict-free motion of multiple mobile robots based on decentralized motion planning and negotiation." Proceedings of international conference on robotics and automation. vol. 4. IEEE, 1997. (Year: 1997).*

Liu, Lantao, and Dylan A. Shell. "Large-scale multi-robot task allocation via dynamic partitioning and distribution." Autonomous Robots 33 (2012): 291-307. (Year: 2012).*

* cited by examiner

PARALLELIZED AND MODULAR PLANNING SYSTEMS AND METHODS FOR ORCHESTRATED CONTROL OF DIFFERENT ACTORS

BACKGROUND

A warehouse may use several actors to independently perform tasks towards a collective goal. For instance, a first set of actors may pick items for different customer orders from storage, and may deliver the picked items to a second set of actors. The second set of actors may group different subsets of the picked items that belong to different customer orders.

Assigning and/or performing tasks to the actors in the order that they arrive or become available may be inefficient, and may lead to a reduction in overall productivity. For instance, a first actor may inefficiently travel from one end of the warehouse to another in order to retrieve two items that were ordered sequentially. Additionally, actors may compete for the same resources at the same time when two sequential tasks involve the same resources and/or same position. In this instance, one or more of the actors may become deadlocked, may perform obstacle avoidance, or may otherwise have its performance delayed as a result of having to wait until another actor completes access to a resource and/or position.

DETAILED DESCRIPTION OF PREFERRED EMBODIMENTS

Figure 1:
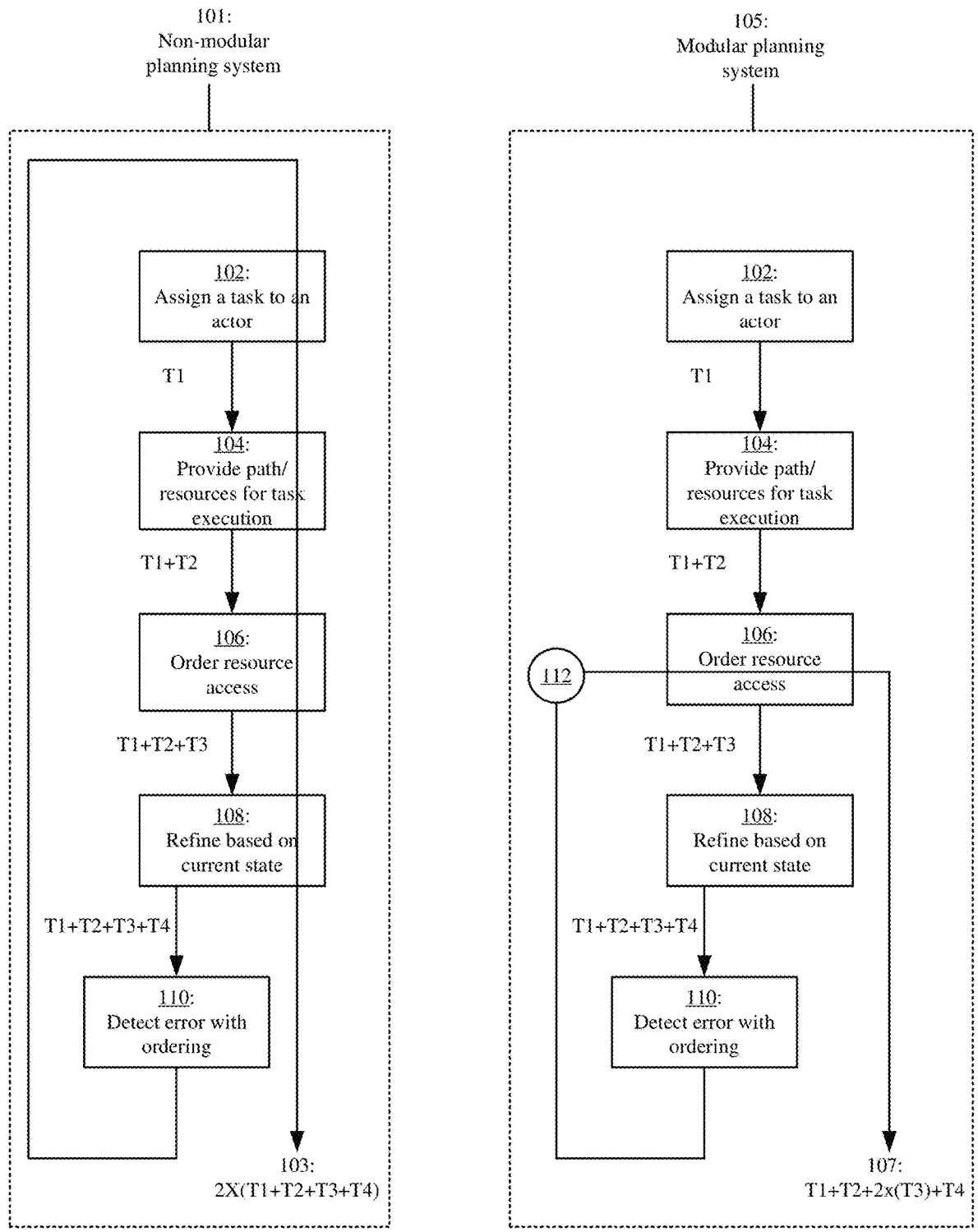
FIG. 1 illustrates an example of modular planning and/or plan updating in accordance with some embodiments presented herein.

The following detailed description refers to the accompanying drawings. The same reference numbers in different drawings may identify the same or similar elements.

Disclosed is a parallelized and modular planning system with methods for orchestrating control of different actors in a manner that maximizes productivity while minimizing conflict between actors and/or resources that are accessed by the actors. The planning system may control the actors in performing different tasks simultaneously without conflict based on a set of plans that are modularly created and/or updated throughout execution of the different tasks. The planning system may update different parts of different plans for different actors at the same time without redefining those plans anew based on changing state of the resources that are accessed by the actors, the state of the actors (e.g., positioning, telemetry, and/or actor performance data), and/or other state information that changes during task execution. A plan may assign a task to a particular actor, may specify a path for task execution, may provide a set of resources and an order with which the particular actor may access the resources in order to perform the task, operations for accessing each of the resources, and/or other instructions to control or direct operation of the particular actor. Therefore, so long as the actors adhere to the paths, resources, and/or timing specified in the plans, the actors are guaranteed not to conflict with one another and/or access resources that are in use by another actor.

In some embodiments, the planning system may include a plurality of modular components or subsystems that contribute independently, at different rates, asynchronously, and/or in parallel to different plans assigned to and/or in the process of being performed by different actors. Each particular subsystem may commence execution in response to a plan contribution made by one or more other components and/or in response to state changes that affect the contributions previously made by the particular component to a plan.

The planning system may generate multiple plans with which different actors may simultaneously execute a set of operations without conflict by accounting for changing resource availability, actor positioning, and/or state changes that result from the planning system generating new plans in response to receiving new tasks, and/or that result as each plan is executed by a different actor. Moreover, the planning system may update parts of a particular plan, without defining the particular plan anew, when unexpected state changes interfere with the execution of the particular plan by one or more actors.

For instance, task execution by a first actor may unexpectedly deviate from a first plan, therefore creating a potential conflict with a second actor executing a second plan that specifies accessing one or more resources that are still being accessed by the first actor. In this case, the planning system may adjust one or more parts of the first plan and/or the second plan using only one or more subsystems of the planning system to eliminate the potential conflict without having to entirely redefine the first plan or the second plan, and without halting operation of either the first actor or the second actor to complete the replanning. Specifically, redefining the first plan and/or the second plan by using all subsystems to replan all parts of the first plan and/or second plan would consume more time than the modular replanning that is performed by some embodiments, and may lead to greater downtime for the first actor and/or second actor as they await for the entirely new plans to be generated. Similarly, redefining the first plan and/or the second plan by using all subsystems to replan all parts of the first plan and/or second plan would prevent the subsystems from generating new plans and/or modifying other plans for other actors while the replanning is taking place, and may cause the other actors to become idle as a result.

FIG. 1 illustrates an example of modular planning and/or plan updating in accordance with some embodiments presented herein. As shown, creating a plan may include assigning (at 102) a task to an actor for execution, provide (at 104) a path and/or resources with which the actor is to complete the assigned task, ordering (at 106) and/or prioritizing access to the resources about the path based on other plans that involve other actors accessing the same resources at or near the same time, and/or refining (at 108) the plan during execution to ensure non-conflicting access to the resources based on current state (e.g., resource, actor, and/or monitored state information).

Refining (at 108) the plan may include detecting (at 110) unexpected state that prevents execution of the plan as defined. For instance, an unexpected failure or state change may introduce an error or conflict.

Non-modular planning system 101 may discard the previously defined plan, may repeat the assigning (at 102), providing (at 104), ordering (at 106), refining (at 108), and/or other planning operations in order to define a new plan that accounts for the unexpected failure or state change. Recreating the plan anew may double the overall time for plan creation. As shown in FIG. 1, recreating a plan by reperforming all planning operations in response to detecting an error or potential conflict may result in first total time 103.

First total time 103 may create a bottleneck in task execution especially when several plans, that are being executed by different actors, are affected, and non-modular planning system 101 is to recreate each of the affected plans anew. In this circumstance, one or more of the actors may remain idle until non-modular planning system 101 creates a new plan to account for the failure and/or unexpected state change. Moreover, actors that have completed previously assigned plans may be left idle until non-modular planning system 101 clears the backlog of affected plans before being able to generate new plans for the idle actors.

However, as shown in FIG. 1, modular planning system 105 of some embodiments may create and update the plan to resolve the detected (at 110) error or potential conflict in second total time 107 that is less than first total time 103. Specifically, modular planning system 105 may create a plan based on a single iteration of assigning (at 102), providing (at 104), ordering (at 106), refining (at 108), and/or other planning operations, may detect (at 110) the unexpected failure and/or state change, and may modularly update (at 112) the part of the plan, that is affected by the unexpected failure and/or state change, rather than define the plan anew.

As shown in FIG. 1, modular planning system 105 may determine that the failure or state change impacts the resource access ordering (e.g., the contributions to the plan made by the ordering subsystem), and may reorder (at 106) access to one or more resources without reperforming any of the assigning (at 102), providing (at 104), refining (at 108), and/or other planning operations. Consequently, the modular updating (at 112), that is performed by modular planning system 105 of some embodiments, results in second total time 107 being less than first total time 103, which, in turn, allows modular planning system 105 to update more plans in less time than non-modular planning system 101, and thereby cause fewer actors to idle until they receive the updated plans and/or new plans from modular planning system 105.

Figure 2:
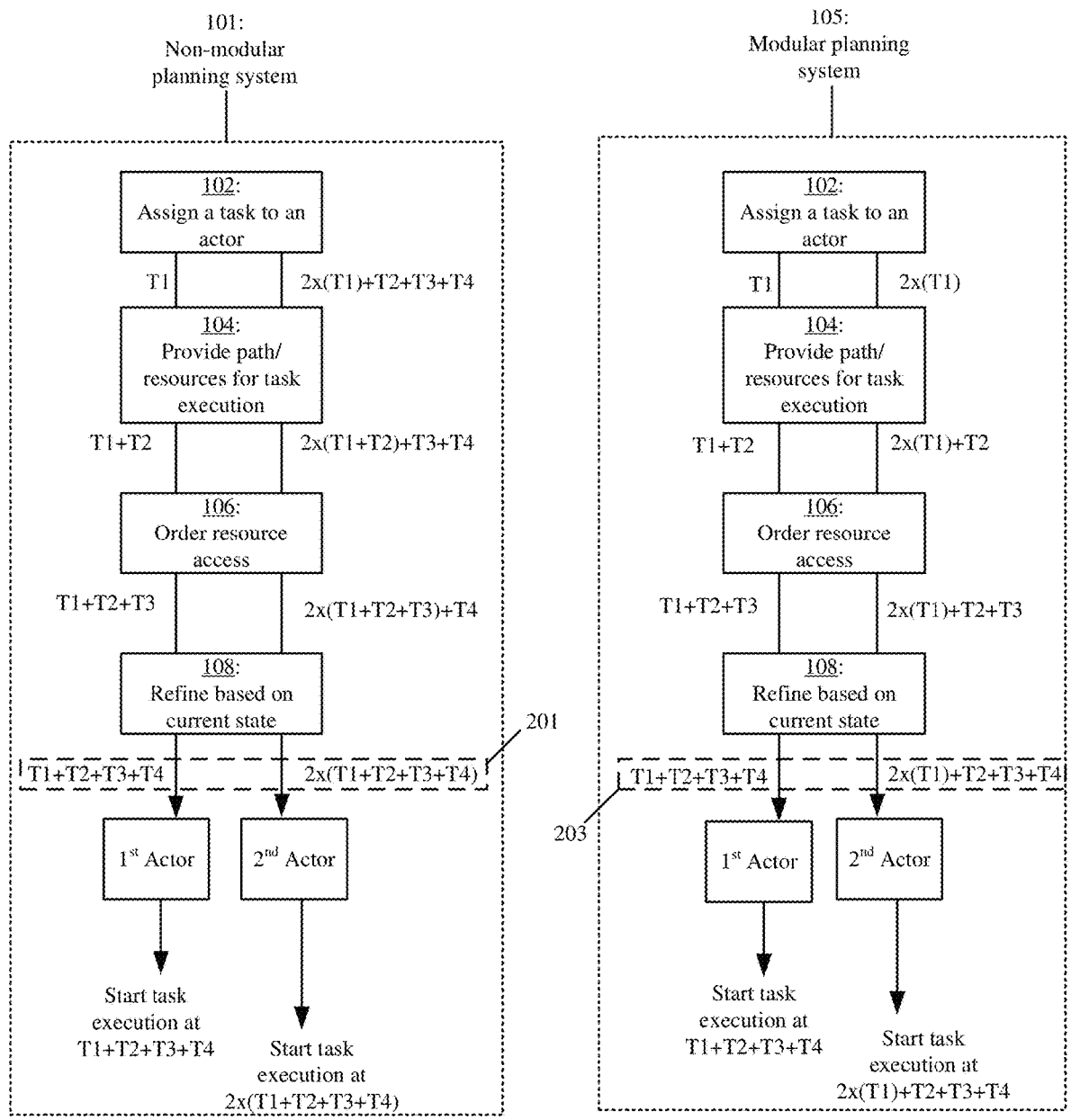
FIG. 2 illustrates an example of parallelized modular planning in accordance with some embodiments presented herein.

An additional advantage of modular planning system 105 over other planning systems is the ability to define multiple plans in parallel. FIG. 2 illustrates an example of parallelized modular planning in accordance with some embodiments presented herein.

Non-modular planning system 101 may perform each of the assigning (at 102), providing (at 104), ordering (at 106), refining (at 108), and/or other planning operations in a single pass to create one plan, and may update state information after creating the plan. Non-modular planning system 101 may determine the state changes that result from each previously created plan (e.g., allocated resources, actor positioning, etc.) before creating another plan. Consequently, non-modular planning system 101 may generate each plan after first amount of time 201.

Modular planning system 105 of some embodiments may have different subsystems contribute to different plans at the same time, and may generate multiple plans in parallel while still accounting for the state changes that result from contributions the subsystems have made to earlier plans. For instance, as shown in FIG. 2, modular planning system 105 may perform the assigning (at 102) of a first task to a first actor via a first subsystem of modular planning system 105, while simultaneously providing (at 104) the path for completion of a second task already assigned to a second actor via a second subsystem of modular planning system 105. Consequently, modular planning system 105 may generate multiple plans in parallel with each plan, after an initial plan, being generated in second amount of time 203, wherein second amount of time 203 may add the delay of a first and/or single subsystem of modular planning system 105 to the total time of creating the first plan rather than the delay of all subsystems, as shown for first amount of time 201 for generating the second plan with non-modular planning system 101.

Figure 3:
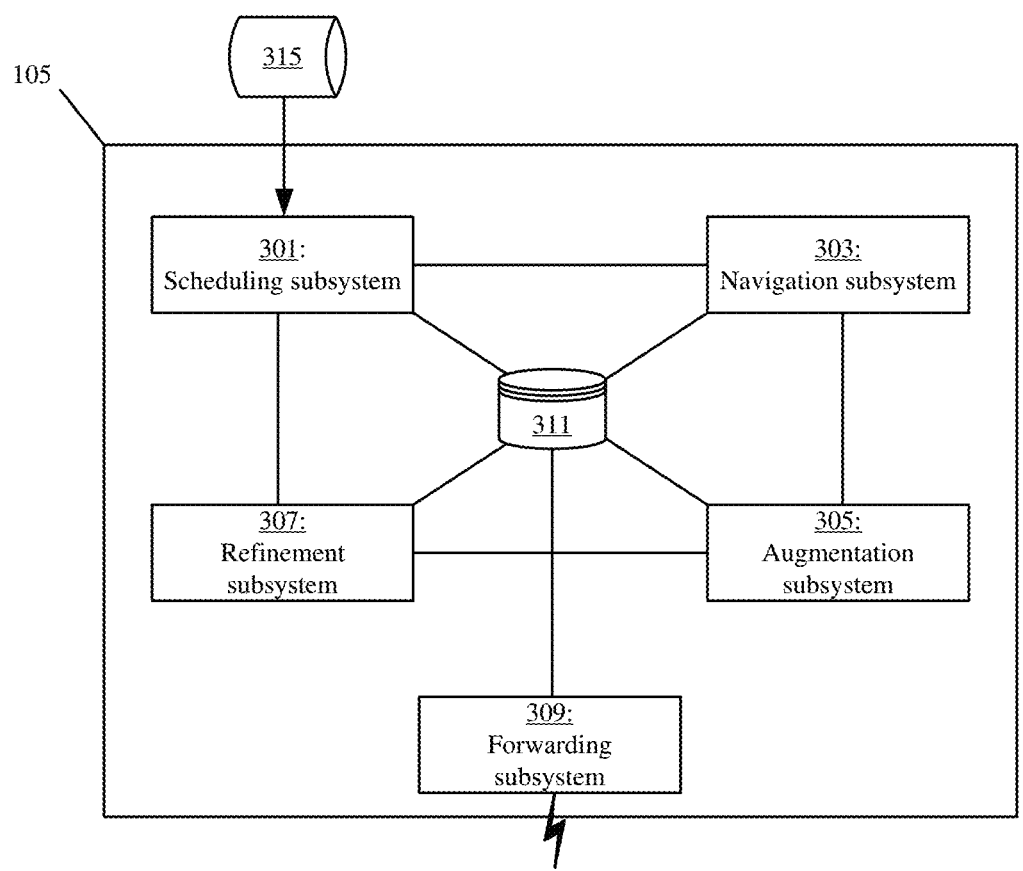
FIG. 3 illustrates an example architecture for a modular planning system in accordance with some embodiments presented herein.
Figure 3:
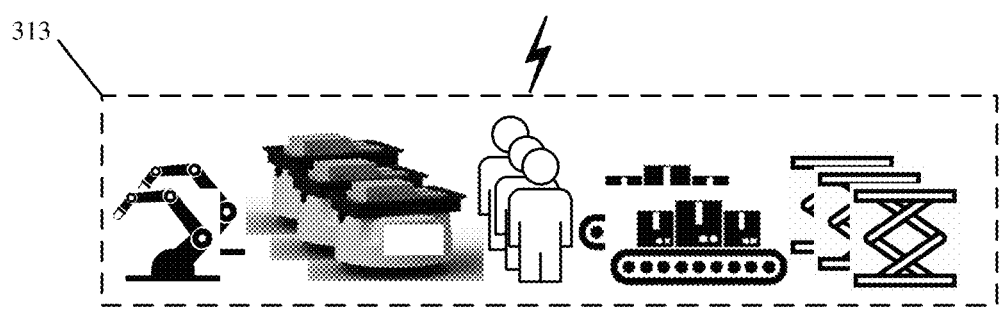

FIG. 3 illustrates an example architecture for modular planning system 105 in accordance with some embodiments presented herein. As shown in FIG. 3, modular planning system 105 may include scheduling subsystem 301, navigation subsystem 303, augmentation subsystem 305, refinement subsystem 307, forwarding subsystem 309, and database 311. The quantity of subsystems, illustrated in FIG. 3, is provided for explanatory purposes only. In practice, modular planning system 105 may include additional subsystems, fewer subsystems, different subsystems, or differently arranged subsystems than illustrated in FIG. 3. Alternatively, or additionally, one or more of subsystems 301, 303, 305, 307, and/or 309 may perform one or more of the planning operations described as being performed by another one or more of subsystems 301, 303, 305, 307, and/or 309.

Subsystems 301, 303, 305, 307, and/or 309 and database 311 may correspond to different devices and/or components of a single or distributed device. Subsystems 301, 303, 305, 307, and 309 may be interconnected via database 311 or to one another in order to establish a feedback loop whereby output of one subsystem is immediately available to one or more other subsystems. In any case, the modular architecture allows each of subsystems 301, 303, 305, 307, and 309 to execute in parallel, and to contribute to different parts of the same plan or different plans at the same time.

Database 311 may store each plan that is defined by the subsystems of modular planning system 105, the resources that may be accessed during plan execution and/or that may be used to define paths for plan execution, and/or parameters of actors 313. In some embodiments, each plan may be associated with a unique plan identifier. Each subsystem of the modular planning system 105 may access and/or contribute to any plan using the corresponding plan identifier. Similarly, each resource may be identified with a unique resource identifier. The resource identifier may be used to determine the current and/or terminal location or position of a particular resource and/or other parameters associated with the particular resource. The resource identifier may also be used to identify which plans have paths that involve accessing that particular resource and/or other information related to the access. Database 311 may store other identifiers, including actor identifiers and/or task identifiers, and may establish links between the identifiers. For instance, a particular plan identifier may be associated with a plan defining a path that involves accessing a set of resources. Accordingly, resource identifiers for each of the set of resources may be linked to the particular plan identifier.

In some embodiments, some parts of a plan may be dependent on other parts of a plan. For instance, navigation subsystem 303 may reference contributions made to a particular plan by scheduling subsystem 301 before providing its own contributions to the particular plan. Using the feedback loop and the shared access to database 311, navigation subsystem 303 may determine when scheduling subsystem 301 has contributed to the particular plan, and navigation subsystem 303 may subsequently contribute to the particular plan by referencing the contributions made by scheduling subsystem 301. Similarly, a contribution by refinement subsystem 307 to the particular plan may require navigation subsystem 303 to update its contributions to the particular plan. Navigation subsystem 303 may query database 311 for contributions made by refinement subsystem 307 that impact previous contributions made by navigation subsystem 303, and navigation subsystem 303 may modify its contributions to the particular plan in response to detecting that the navigation subsystem 303 contributions have been impacted by contributions made by refinement subsystem 307.

Scheduling subsystem 301 may include an independently executing service, component, and/or device of planning system 105 that assigns tasks to different actors 313. Actors 313 may include workers, agents, and/or resources with different capabilities for performing different tasks. Actors 313 may include humans, autonomous robots, mechanical devices, sensors, computer-controlled machinery (e.g., conveyor belts, lifts, packaging devices, etc.), and/or logical workers, agents, and/or resources. Actors 313 may continually provide updated parameters to database 311. For instance, actors 313 may update database 311 with their respective positions, telemetry, and/or other state (e.g., performing a retrieval task, obtained a particular object, etc.) on a recurring basis (e.g., every second), and database 311 may store updated parameters for each actor 313 in a record or data structure that may be accessed using a unique identifier of the actor 313. The actor parameters may be accessed by any of the planning system subsystems 301, 303, 305, 307, and 309 using the corresponding actor identifiers.

Figure 4:
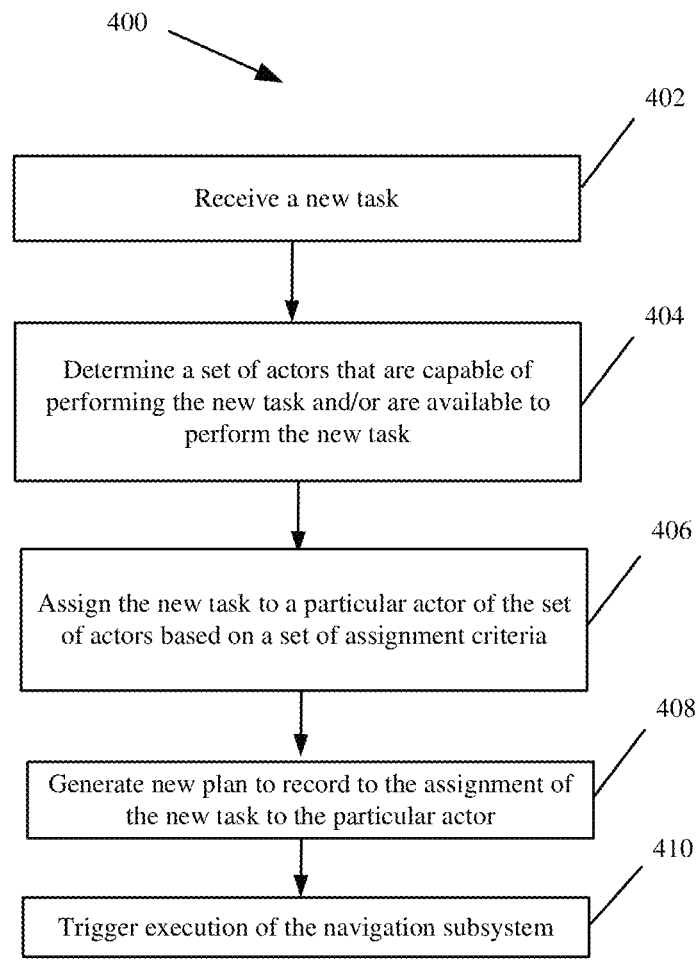
FIG. 4 presents a process for modular and parallel task-to-actor assignment in accordance with some embodiments presented herein.

FIG. 4 presents a process 400 for the task-to-actor assignment modular planning operations performed by scheduling subsystem 301 in accordance with some embodiments presented herein. Process 400 may include receiving (at 402) a new task from external data source 315. External data source 315 may include an ordering system, an online merchant storefront, and/or other systems that interface with modular planning system 105 and that provide tasks to modular planning system 105. The tasks may include fulfilling customer orders, inventory management, service provisioning, and/or actions that are to be completed by one or more actors 313.

In some embodiments, external data source 315 may enter newly received tasks in database 311. Database 311 may create a unique task identifier for each received task. Receiving (at 402) a new task may include scheduling subsystem 301 querying database 311 for any new tasks without an assigned actor, and database 311 providing the identifiers for new tasks without assigned actors in response to the query. In some embodiments, entry of a task without an assigned actor in database 311 may trigger execution of scheduling subsystem 301, and/or sending of a message with an unassigned task identifier to scheduling subsystem 301.

Process 400 may include determining (at 404) a set of actors 313 that are capable of performing the new task and/or are available to perform the new task. In some embodiments, database 311 and/or scheduling subsystem 301 may track which tasks each actor may perform (e.g., actor capabilities). Database 311 and/or scheduling subsystem 301 may also track which tasks have been previously assigned and/or are pending with which actors 313 in order to determine actor availability. For instance, scheduling subsystem 301 may query database 311 for a set of actors that are assigned 2 or fewer tasks, and that are capable of performing a particular task. Database 311 may respond to the query by providing scheduling subsystem 301 with a list of actor identifiers for a set of actors that satisfy the query criteria.

Process 400 may include assigning (at 406) the new task to a particular actor of the set of actors 313 based on a set of assignment criteria. The assignment criteria may include selecting the actor that can complete the new task in the least amount of time as determined from the number of tasks assigned to and awaiting execution by the set of actors 313 and/or capabilities of the set of actors 313.

In some embodiments, scheduling subsystem 301 may reference existing plan information contributed by the other subsystems of modular planning system 105 to database 311 in order to more accurately satisfy the assignment criteria. For instance, scheduling subsystem 301 may analyze the paths for tasks being performed by the set of actors 313 to determine the positioning of the set of actors 313, and to assign the new task based on proximity of the set of actors 313 to the new task at the completion of the tasks current being performed by the set of actors 313. Specifically, scheduling subsystem 301 may receive a new task involving retrieval of an item that is at a first location in a warehouse. Scheduling subsystem 301 may inspect defined plans in database 311 to determine a subset of actors 313 performing retrieval tasks within a specified distance from the first location, and may assign (at 406) the new task to a particular actor from the subset of actors 313 that is closest to finishing all previously assigned tasks first.

In some embodiments, scheduling subsystem 301 may use artificial intelligence and/or machine learning to predict which of the set of actors 313 is likely to provide earliest and/or most efficient completion of the new task. For instance, scheduling subsystem 301 may monitor previously defined plans in database 311 to determine the time it takes different actors 313 to complete tasks that are similar to the newly received task. Scheduling subsystem 301 may determine that a robot outperforms a human in retrieving a heavy or large item (e.g., an item weighing over 50 pounds), and scheduling subsystem 301 may assign the new task to the robot based on the new task involving retrieval of a heavy object. Scheduling subsystem 301 may also use artificial intelligence and/or machine learning to bias the performance of actors 313 based on time of day or date. For instance, from monitoring plan execution by actors 313, scheduling subsystem 301 may determine that a first actor that is beginning a shift is likely to outperform a second actor that is ending a shift, and may therefore assign (at 406) the new task to the first actor over the second actor despite both actors being occupied with other tasks and/or the second actor having fewer remaining tasks to complete than the first actor. Scheduling subsystem 301 may bias the performance of actors 313 based on other learned factors such as speed of movement, speed of retrieval, and/or traveling direction of an actor. Accordingly, even though a first actor is determined to become available sooner than a second actor, scheduling subsystem 301 may determine that the second actor will complete its assigned task at a location that is closer to the location of the new task than the first actor, and may assign (at 406) the new task to the second actor to reduce wasted travel time and/or to avoid creating additional obstacles or collisions by moving the first actor from one region to another region and occupying space and/or resources to do so.

Process 400 may include generating (at 408) a new plan to record the task-to-actor assignment. Generating (at 408) the new plan may include creating a new entry, data structure, and/or record in database 311, and/or populating the new entry, data structure, and/or record with a plan identifier, a task identifier, and/or actor identifier. The plan identifier may uniquely identify the new plan from other plans. The task identifier may identify the new task. The actor identifier may identify the particular actor selected by scheduling subsystem 301 to execute the new task identified by the task identifier. In some embodiments, the task identifier may provide additional information such as the task operation (e.g., retrieval, pick, pack, ship, etc.) and/or a location or coordinates for the terminal destination of the task (e.g., where to perform the task). Generating (at 408) the new plan may include locking one or more of the plan identifier, task identifier, and/or actor identifier to prevent other subsystems from simultaneously accessing or changing state associated with one or more of these identifiers.

Process 400 may include triggering (at 410) execution of navigation subsystem 303 in response to assigning (at 406) the new task to the particular actor and/or generating (at 408) the new plan with the task-to-actor assignment. In some embodiments, execution of navigation subsystem 303 may be triggered (at 410) as a result of navigation subsystem 303 periodically (e.g., when idle or every 5 seconds) scanning database 311 for plans that have a task assigned to an actor, and that have no further information (e.g., no path defined for executing the assigned task). Alternatively, navigation subsystem 303 may scan database 311 for plans that have no defined path or that have an invalidated path, wherein an invalidated path may include a path that was previously defined by navigation subsystem 303 and that has been invalidated by another subsystem of planning system 105 due to a potential conflict, unavailable resource, and/or other issues detected by the other subsystems.

Navigation subsystem 303 may determine the paths and/or resources that actors 313 may access in order to perform different assigned tasks without conflicting with one another. In some embodiments, navigation subsystem 303 may determine an optimal or efficient path with which a particular actor may complete and/or perform an assigned task. An optimal path may include a path with the shortest travel distance for completing a task or reaching the terminal destination of a task, or a path with which an actor may complete a task or reach the terminal destination in the least amount of time. Navigation subsystem 303 may account for distance, expected number of conflicts along a particular path and delays associated with those conflicts, capabilities of the actor (e.g., average speed, time to turn, time to perform obstacle avoidance, pick speed, etc.), and/or factors in computing the fastest path or path through which the assigned actor may complete a task in the least amount of time.

In some embodiments, determining the optimal path may include allocating a set of resources that comprise the optimal path for non-conflicting access by the particular actor. Accordingly, navigation subsystem 303 may define a path as a graph, linked list, and/or other definition of resources that the particular actor is authorized to access in the performance of the task.

In some embodiments, a path may be defined as a sparse graph. The sparse graph may include nodes corresponding to waypoints that an actor may access and/or use to complete a task. The waypoints may correspond to a subset of resources for completing a task. In other words, for computational efficiency, navigation subsystem 303 may define a path to include significant waypoints or resources at which operation of the actor may change (e.g., actor changes directions, transitions from a moving operation to a picking operation, etc.).

The resources that form a path may include physical and/or logical resources within a warehouse or site. For instance, physical resources may include space within aisles or pathways that actors 313 may traverse. Each such resource may include various parameters that define how the resource may be accessed. For instance, an intersection resource may include parameters that allow an actor to change directions, whereas a straight-path resource may include parameters that limit the speed with which an actor may access that resource. Other resources that may be used to define a path may include storage locations, retrievable items, secured points-of-entry, boxes for item storage, elevators, conveyor systems, compute resources, and/or other suitable objects or services that actors 313 may use and/or access in order to complete and/or perform various tasks.

Modular planning system 105 may map available resources within a warehouse and/or site, may store the available resources and their location in the warehouse and/or site to database 311, and/or may associate various timing parameters to each resource. In some embodiments, the available resources and their corresponding locations may be provided via a configuration file, or may be mapped based on information obtained from sensors of actors 313 traversing the warehouse and/or site. The timing parameters may specify expected time for an actor to access each resource. For instance, a first resource may correspond to a straight section in an aisle where the average time to access is 3 seconds (e.g., average time for actors 313 to traverse the straight section), and a second resource may correspond to an intersection where the average time to access is 5 seconds due to the increased time associated with actors 313 rotating or changing directions at the intersection.

Figure 5:
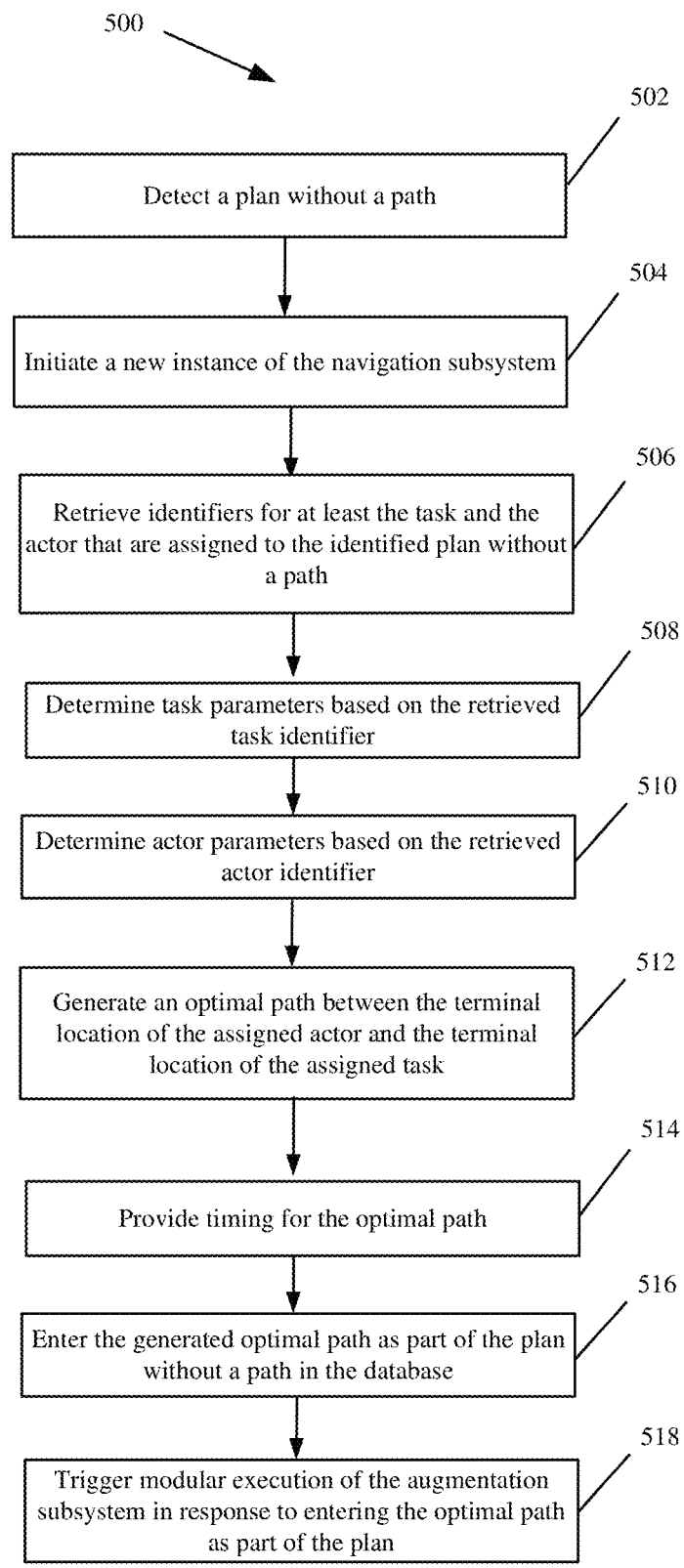
FIG. 5 presents a process for modular and parallel path definition in accordance with some embodiments presented herein.

FIG. 5 presents a process 500 for modular and parallel path definition in accordance with some embodiments presented herein. Process 500 may be implemented by navigation subsystem 303.

Process 500 may include detecting (at 502) a plan without a path in database 311. As noted above, database 311 may be populated with plans that have no paths in response to scheduling subsystem 301 creating a new plan by assigning a task to an actor, and/or by other subsystems of planning system 105 invalidating a previously defined path for a plan. Detecting (at 502) the plan without a path may include navigation subsystem 303 querying database 311 for any plans that have no defined paths. For instance, navigation subsystem 303 may query database 311 for any plans with empty path definitions or data structures. Detecting (at 502) the plan without a path may also include receiving indications and/or messaging from scheduling subsystem 301 of a newly created plan without a path, or from other subsystems that may have invalidated a previously defined path for a particular plan.

Process 500 may include initiating (at 504) a new instance of navigation subsystem 303 in response to detecting (at 502) a plan without a path. In some embodiments, navigation subsystem 303 may include a controlling instance that spawns and/or initiates different worker instances, and each worker instance may define the path for a different plan. Navigation subsystem 303 may have multiple worker instances executing simultaneously. Each instance may correspond to a different thread, process, and/or executing image of navigation subsystem 303. Each instance of navigation subsystem 303 may run at the same time as scheduling subsystem 301 and/or other subsystems of modular planning system 105, and each running instance or subsystem may execute independently. For instance, scheduling subsystem 301 may assign a new task to a first actor while process 500 runs to generate a path for another task that scheduling subsystem 301 assigns to a second actor.

Process 500 may include retrieving (at 506) identifiers for at least the task and the actor that are assigned to the identified plan without a path. For instance, when assigning a task to an actor, scheduling subsystem 301 may create a data structure for the particular plan, and may populate the data structure with the identifiers for the assigned task and actor. As noted above, the identifiers may include values for uniquely identifying each task to be performed or each actor 313. In some other embodiments, the identifiers may include pointers to data substructures that store additional information about the assigned task and/or the assigned actor.

Process 500 may include determining (at 508) task parameters based on the retrieved (at 506) task identifier. The task parameters may provide locations and/or coordinates for the task, identification of objects or resources associated with the ask, and/or other task-related information. For instance, the initiated instance of navigation subsystem 303 may query database 311 using the task identifier in order to identify a terminal location for the assigned task. The terminal location may correspond to a position within the warehouse at which the actor completes and/or performs the task. The terminal location may therefore correspond to the location where an item pending retrieval is stored, or to a destination to which a retrieved item is to be delivered. Database 311 may store the location and/or position of each resource, and may store a mapping between the locations and/or positions and the task identifiers. For instance, a task identifier may involve retrieval of a particular object in a site, and the task identifier may be mapped to a particular storage location in the site where the particular object is stored.

Process 500 may include determining (at 510) actor parameters based on the retrieved (at 506) actor identifier. For instance, the initiated instance of navigation subsystem 303 may query database 311 using the retrieved actor identifier in order to identify a current or terminal location and/or position of the actor assigned to complete the task of the plan without a path. As noted above, actors 313 may continually update (e.g., every second) database 311 with their current position in the site, and database 311 may store the current position of each actor. The actor's terminal location may differ from the actor's current position when the actor is executing another plan and/or another task that was previously assigned to the actor. Accordingly, the actor's terminal location may correspond to the future location of the actor when the actor is ready to commence executing the newly assigned task. Navigation subsystem 303 may determine (at 510) the actor's terminal location by using the actor identifier to retrieve another plan that is defined with a path and that has the actor performing a previously assigned task. Navigation subsystem 303 may then use the task identifier for the previously assigned task to determine the terminal location for the previously assigned task, and the terminal location for the previously assigned task may correspond to the terminal location of the actor.

Other actor parameters, that may be relevant for the path planning and that may be determined (at 510) from the actor identifier, may include capabilities of the assigned actor. For instance, the actor identifier may be associated with a set of movement rules that restrict which resources or pathways the actor may traverse. The capabilities may track the average speed, maximum speed, and/or other performance metrics with which the actor may perform different operations. For instance, the actor may travel in a straight line at a first speed, and may change directions at a second speed. Navigation subsystem 303 may use the actor parameters to bias or alter the path planning.

Process 500 may include generating (at 512) an optimal path between the terminal location of the assigned actor and the terminal location of the assigned task. Generating (at 512) the optimal path may include determining different sets of resources or waypoints with which the assigned actor may access the terminal location of the assigned task from the actor's terminal location, and selecting the set of resources or waypoints that allow the assigned actor to reach and/or perform the assigned task in the least amount of distance and/or shortest amount of time relative to other sets of resources or waypoints.

In some embodiments, navigation subsystem 303 may generate (at 512) the optimal path by selecting the set of resources or waypoints that provide the shortest path between the actor's terminal location and the task's terminal location. Alternatively, navigation subsystem 303 may generate (at 512) the optimal path by accounting for the time to access each resource, and by computing the path that results in the shortest overall time. Navigation subsystem 303 may account for the additional time it would take for the actor to repeatedly change direction and/or the capabilities (e.g., moving speed) of the actor, and may select the path with the fewest changes of direction.

In some embodiments, navigation subsystem 303 may account for congestion at various resources in generating the optimal path. For instance, navigation subsystem 303 may query database 311 to determine the number of times that different resources have been included as part of other paths. Navigation subsystem 303 may then generate the optimal path by associating a time penalty to any resource that is already part of other planned paths, and/or by accounting for the time penalties in addition to the overall distance, number of resources, and/or average access time for the resources of the optimal plan.

Process 500 may include providing (at 514) timing for the optimal path. Providing (at 514) timing for the optimal path may include estimating a time at which the assigned actor is expected to access each resource and/or waypoint of the optimal path based on the determined capabilities of the actor and/or timing parameters associated with each resource (e.g., average time to access a particular resource).

As noted above, navigation subsystem 303 may bias the timing based on the availability or expected congestion at each resource. For instance, if navigation subsystem 303 queries database 311 and determines that a particular resource is not included as part of any other plans in database 311, then no biasing may be made to the timing for accessing that particular resource. However, if navigation subsystem 303 queries database 311 and determines that a particular resource is included as part of 4 other plans in database 311, then navigation subsystem 303 may bias the timing for accessing the particular resource by a first amount to account for the access and/or usage of the particular resource by other actors and/or in the performance of other plans. In some embodiments, navigation subsystem 303 may bias the timing of the particular resource when the expected access times in the other plans are within some threshold time of the expected access by the assigned actor for the particular plan.

Process 500 may include entering (at 516) the generated optimal path as part of the plan without a path in database 311. For instance, navigation subsystem 303 may add the generated optimal path and/or timing information to the plan. In some embodiments, the generated optimal path and/or timing information may be defined as a list of tuples that include resource identifiers, positional information, timing data, and/or other data for each resource and/or waypoint in the planned path.

Entering (at 516) the generated optimal path may also include updating other information within database 311. For instance, navigation subsystem 303 may obtain the identifier for each resource of the optimal path, and may update a mapping of database 311 that tracks the allocation of each resource to different paths and/or plans. In other words, database 311 may store a resource-to-path mapping table. The resource-to-path mapping may link the identifier of each particular resource in the warehouse to the identifiers of zero or more paths or plans that include that particular resource in a defined path or plan. Accordingly, querying database 311 for a particular resource identifier may return the identifiers for every plan with a path that includes the resource identified by the particular resource identifier. In this manner, the subsystems of modular planning system 105 may determine congestion at a resource.

Figure 6:
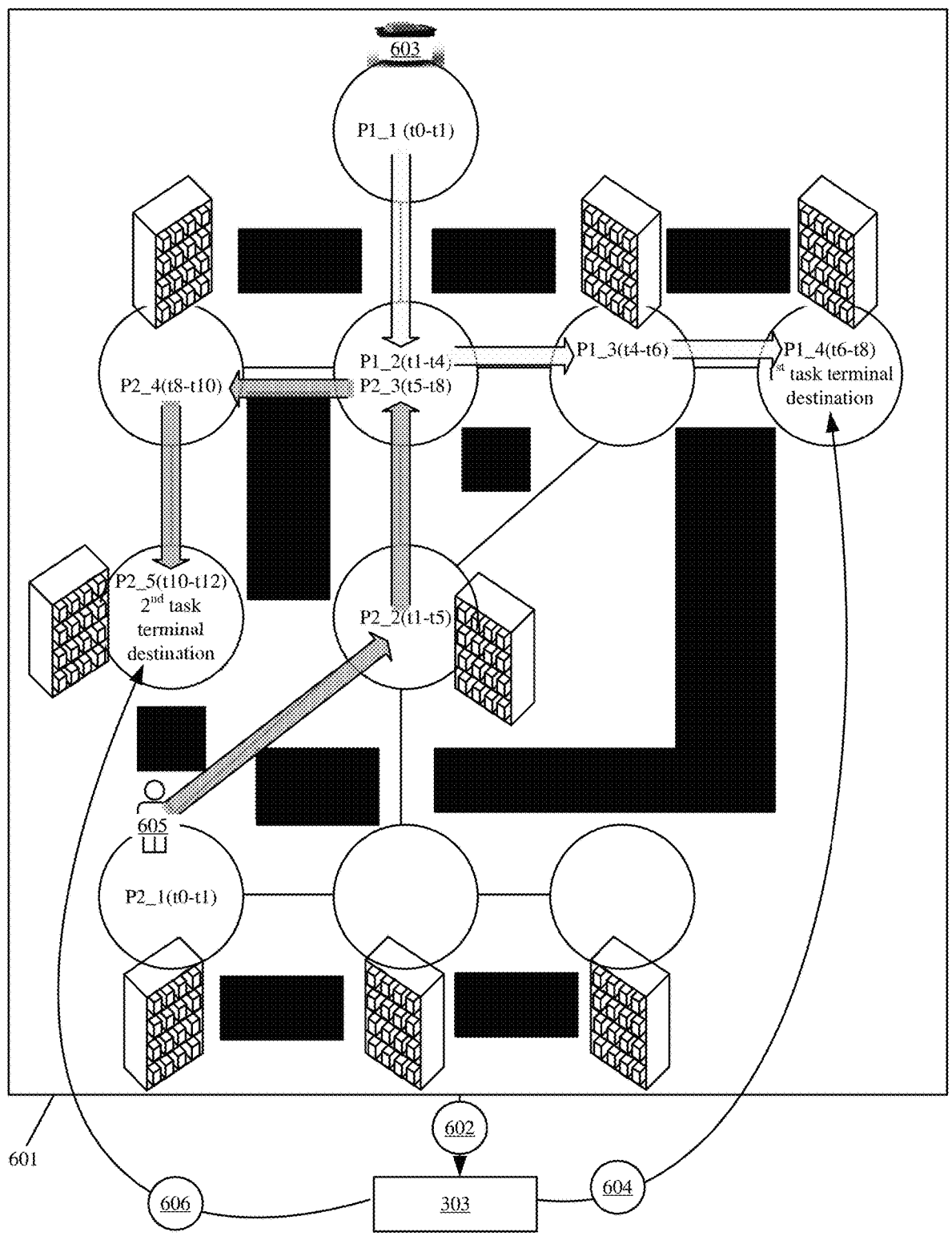
FIG. 6 illustrates example generation of a first path for a first plan and a second path for a second plan in accordance with some embodiments presented herein.

FIG. 6 illustrates an example of navigation subsystem 303 generating a first path for a first plan and a second path for a second plan in accordance with some embodiments presented herein. As shown in FIG. 6, navigation subsystem 303 may access (at 602) resource map 601. Resource map 601 may provide the location and/or other parameters of each resource in a site.

Navigation subsystem 303 may generate (at 604) the first path to include the fewest resources that first actor 603 may access in order to perform a first task of the first plan, and may generate (at 606) the second path to include the fewest resources that second actor 605 may access in order to perform a second task of the second plan. The first path and the second path may include one or more of the same resources.

To generate (at 604) the first path, navigation subsystem 303 may determine the current and/or terminal location of first actor 603, may determine the terminal location for the task assigned to first actor 603, and may determine the optimal set of resources by which first actor 603 may perform and/or complete the assigned task at the terminal location of the assigned task. Navigation subsystem 303 may define the first path as a linked list of the resource identifiers that first actor 603 may access in order to complete and/or perform the task associated with the first task and/or first plan.

As shown in FIG. 6, the first path and the second path may include expected times by which each actor accesses different resources in the respective paths. Navigation subsystem 303 may derive the expected times from average access times associated with each resource and/or capabilities of the actors accessing those resources.

With reference back to FIG. 5, process 500 may include triggering (at 518) modular execution of augmentation subsystem 305 in response to entering (at 516) the optimal path as part of the plan in database 311. For instance, navigation subsystem 303 may provide a signal to augmentation subsystem 305 once a path has been generated for a plan. Alternatively, augmentation subsystem 305 may query database 311 for any plans with newly defined paths, and may trigger execution of a new instance of augmentation subsystem 305 upon detected a newly defined path.

Augmentation subsystem 305 may provide an ordering that minimizes and/or eliminates conflict between different plans with paths involving different actors accessing the same resource and/or waypoint. In doing so, augmentation subsystem 305 may update the paths created by navigation subsystem 303 by overriding or changing the expected time at which an actor may access a particular resource based on the kinematics and/or telemetry of that actor and other actors following paths that call for accessing that particular resource at or near the same time.

Augmentation subsystem 305 may run in parallel with other subsystems of modular planning system 105. Accordingly, augmentation subsystem 305 may provide the resource ordering for resources in a first path of a first plan at the same time as navigation subsystem 303 generates a second path with the same and/or different resources for a second plan, and/or at the same time as other subsystems of modular planning system 105 executing their respective operations.

Figure 7:
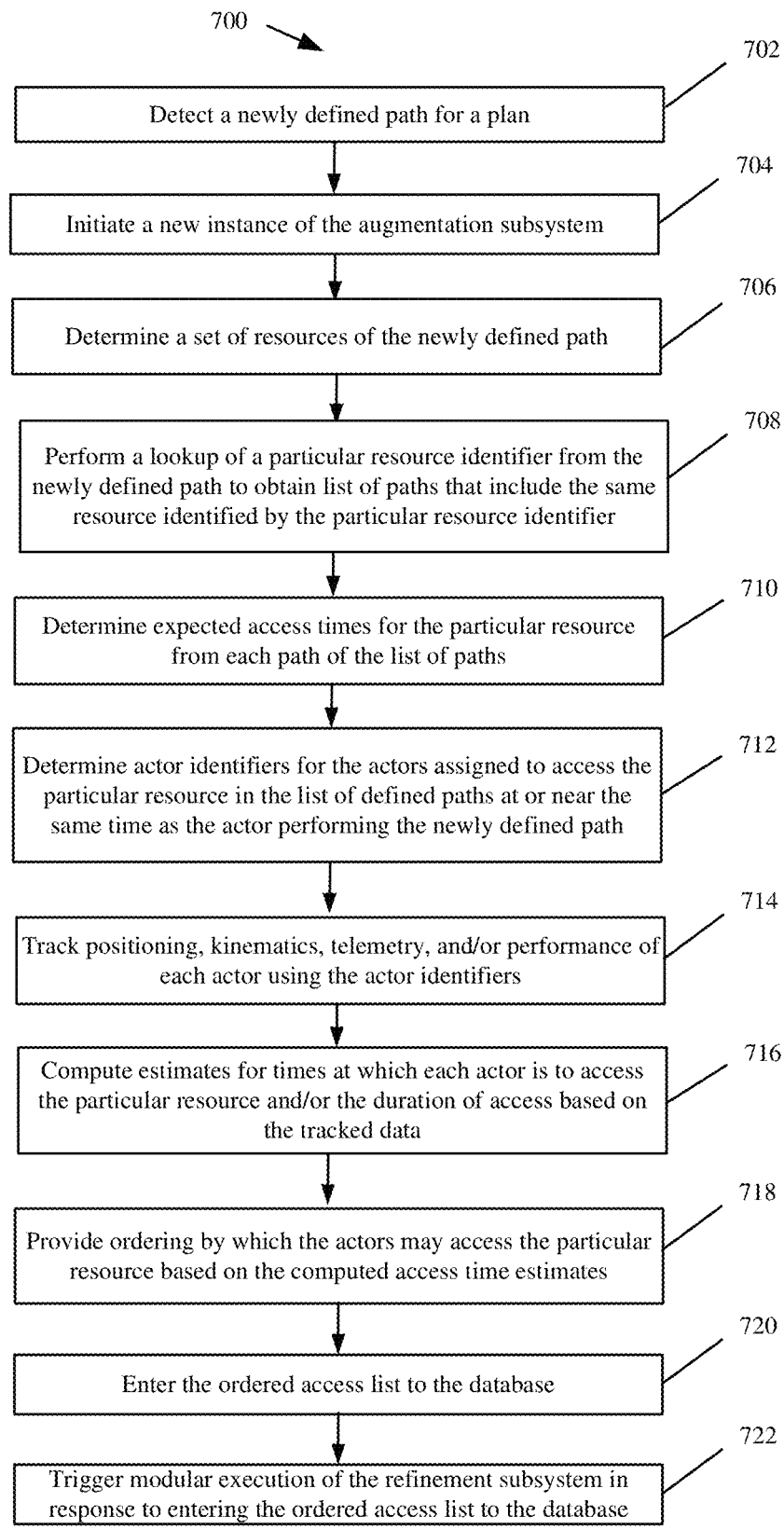
FIG. 7 presents a process for reordering resource access in accordance with some embodiments presented herein.

FIG. 7 presents a process 700 for reordering resource access in accordance with some embodiments presented herein. Process 700 may be executed simultaneously by different instances of augmentation subsystem 305. Each instance of augmentation subsystem 305 may correspond to a different thread, process, and/or executing image of augmentation subsystem 305. Each instance of augmentation subsystem 305 may run at the same as and/or independent of other running instances or subsystems of modular planning system 105.

Process 700 may include detecting (at 702) a newly defined path for a plan in database 311. Augmentation subsystem 305 may query database 311 to detect plans with newly defined and/or modified paths. Process 700 may include instantiating (at 704) a new instance of augmentation subsystem 305 to provide a non-conflicting order of access for resources that are specified as part of the newly defined path.

Process 700 may include determining (at 706) a set of resources of the newly defined path. In some embodiments, augmentation subsystem 305 may use the plan identifier, that identifies the plan with the newly defined path, in order to obtain the identifiers that uniquely identify each resource of the newly defined path. In some embodiments, augmentation subsystem 305 may access the list of tuples that make up the newly defined path in order to determine (at 706) the set of resources of the newly defined path.

Process 700 may include performing (at 708) a lookup in database 311 of a particular resource identifier from the newly defined path. In response to the lookup, database 311 may return a list of defined paths and/or plan identifiers that include the particular resource identified by the particular resource identifier.

Process 700 may include determining (at 710) expected access times for the particular resource, that is identified by the particular resource identifier, from each path of the list of defined paths. In some embodiments, augmentation subsystem 305 may filter the expected access times to retain those that are within some threshold amount of time as the expected time for the particular resource from the newly defined path. In other words, augmentation subsystem 305 may scan the expected access times to determine if there are any potentially overlapping time windows in which two or more actors may attempt to access the particular resource.

Process 700 may include determining (at 712) the actor identifiers for the actors assigned to access the particular resource in the list of defined paths at or near the same time as the actor assigned to perform the newly defined path. Process 700 may include tracking (at 714) the current positioning, kinematics, telemetry, and/or past performance of each actor using the determined (at 712) actor identifiers. In some embodiments, each actor may update database 311 with their current positioning, kinematics, telemetry, and/or performance, and database 311 may retain a record of the updates and/or may process the updates to track historical positioning, kinematics, telemetry, and/or performance.

Process 700 may include computing (at 716) estimates for times at which each actor is to access the particular resource and/or the duration of access based on the tracked (at 714) actor positioning, kinematics, telemetry, and/or past performance. For instance, augmentation subsystem 305 may determine that a first robot is currently executing a first plan that includes a path with the particular resource that has yet to be accessed, that the first robot is 5 feet from the particular resource, and that the kinematics, telemetry, and/or performance of the first robot indicate an average travel speed of 1 foot per second. Augmentation subsystem 305 may also determine that a second robot is currently executing a second plan that includes a path with the particular resource that has yet to be accessed, that the second robot is 8 feet from the particular resource, and that the kinematics of the second robot indicate an average travel speed of 2 feet per second. Accordingly, based on these values, augmentation subsystem 305 may estimate that the second robot, despite being further from the particular resource, is likely to access the particular resource before the first robot. Augmentation subsystem 305 may also determine that the second robot will access the particular resource more quickly than the first robot (e.g., pass through the particular resource is less time).

Process 700 may include providing (at 718) an ordering by which the actors may access the particular resource based on the computed (at 716) access time estimates. Augmentation subsystem 305 may provide (at 718) an ordering that minimizes or prevents obstacles or collisions between the actors, and/or that allows fastest access to the particular resource by the greatest number of actors in the least amount of time.

In some embodiments, providing (at 718) the ordering may include overriding and/or updating the estimated access times in the plans and/or paths that include the particular resource according to the most efficient ordering. For instance, augmentation subsystem 305 may reduce or increase the estimated access times for the particular resource in different plans and/or paths to set the ordering by which different actors may access the particular resource.

In some embodiments, providing (at 718) the ordering may include linking an ordered list of actor identifiers to the identifier of the particular resource. Accordingly, actors may query the ordered list when attempting to access the particular resource, and if the actor identifier is next in the list, then the actor may access the particular resource. Otherwise, the actor may temporarily halt operations.

In some embodiments, providing (at 718) the ordering may include determining that there is too much congestion at the particular resource over a particular time period. Too much congestion may result when the number of paths and/or actors accessing the particular resource over the particular time period exceeds a threshold value, and/or when actor performance indicates that all actors, that execute paths to access the particular resource, will be unable to access the particular resource in the particular time period. In some such embodiments, augmentation subsystem 305 may invalidate the newly defined path created by navigation subsystem 303 and/or may tag the particular resource as being unavailable over the particular time period. Invalidating the newly defined path may cause navigation subsystem 303 to generate a different path that does not include the particular resource.

In any case, the ordering may provide different actors safe and non-conflicting access to the same resources. Augmentation subsystem 305 may therefore ensure that the paths created by navigation subsystem 303 do not create bottlenecks, productivity stoppages, obstacles, and/or delay actor operation.

Process 700 may include entering (at 720) the ordered access list to database 311. The ordered access list for a resource may be queried whenever that resource is next in the plan and/or path being executed by an actor, and the ordered access list may verify whether that actor may access the resource based on the location of the actor's identifier in the ordered access list. In particular, execution of a plan by a particular actor may include modular planning system 105 determining a next resource that is specified in the planned path being executed by that particular actor, querying the ordered list for the next resource using the identifier of the next resource, reserving access to the next resource for the particular actor in response to the identifier of the particular actor being at the top of the ordered access list, and/or controlling the particular actor in accessing the next resource.

In some embodiments, process 700 may include triggering (at 722) execution of refinement subsystem 307 after providing an ordering for the resources of that particular path. In some other embodiments, augmentation subsystem 305 may trigger execution of refinement subsystem 307 after ordering access to a next resource in a plan so that a particular actor executing that plan may access the next resource as other resources in the plan are being ordered by augmentation subsystem 305.

Real-world execution of the plans by the various actors may deviate from the plans. The deviations may stem from one or more resources that are part of a planned path becoming unavailable upon subsequent execution of that planned path, and/or actual execution of a planned path falling out-of-sync with the timing that is defined for that planned path. For instance, an actor may perform faster or slower than what is expected in a defined plan, an autonomous robot (e.g., a first actor) may experience a failure, an outage (e.g., loss connectivity), and/or may require temporary downtime (e.g., require periodic restarting, an update, charging, etc.), and/or a human actor (e.g., a second actor) may become ill, confused, injured, or may tire after a long workday and perform differently at different times of the day.

Refinement subsystem 307 may control the activity and/or operation of actors 313 to ensure compliance with the plans, and/or to initiate modular corrections to a plan in the event that certain plan resources become unavailable or are not accessed by an expected time or in the specified ordering. In some embodiments, refinement subsystem 307 may generate and/or issue commands to directly control each actor's 313 activity and/or operation according to a plan defined for that actor. The commands may be based on a current location of the actor, capabilities and/or kinematics of the actor, and/or timing specified in the plan to be executed by that actor. For instance, refinement subsystem 307 may generate commands that control the speed and direction of a robot moving from a first resource or waypoint in a plan to a second resource or waypoint in the plan. In this manner, refinement subsystem 307 may ensure that the robot (e.g., actor 313) progress towards the completion of a task specified in a plan by following the specified path according to the plan timing.

Figure 8:
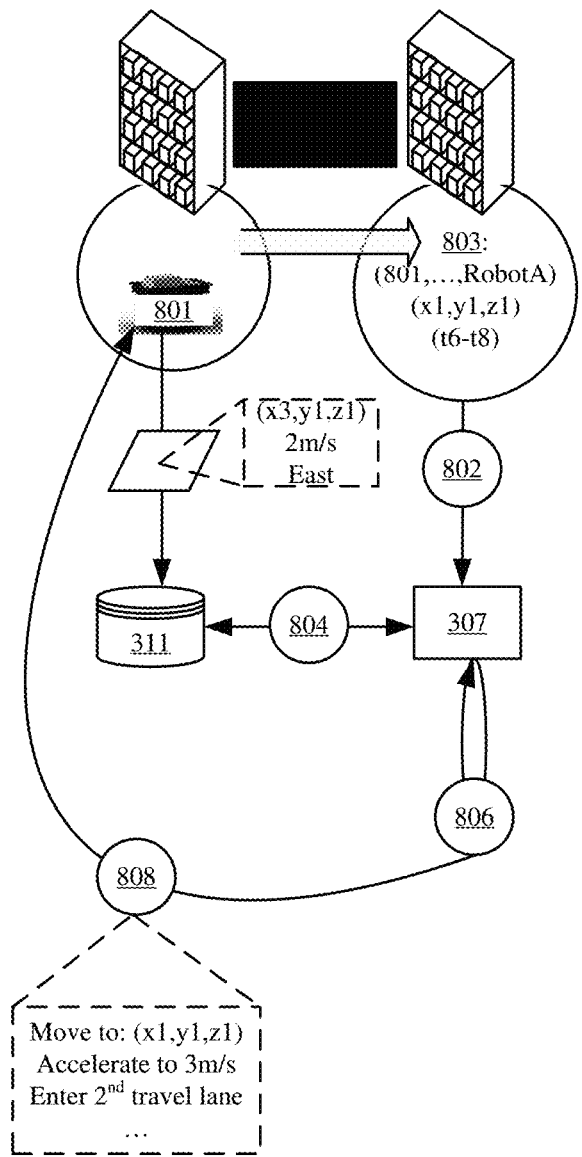
FIG. 8 illustrates an example for controlling operation of an actor based on a plan that is assigned to that actor for execution in accordance with some embodiments presented herein.

FIG. 8 illustrates an example of refinement subsystem 307 controlling operation of actor 801 based on a plan that is assigned to actor 801 for execution in accordance with some embodiments presented herein. Refinement subsystem 307 may obtain the plan that is being executed by actor 801, and/or may determine (at 802) next resource 803 from the path of the plan that actor 801 is to access. More specifically, refinement subsystem 307 may determine (at 802) ordering of actors 313 for accessing next resource 803, a terminal position or coordinates of next resource 803, and/or timing set forth in the planned path by which actor 801 may access next resource 803 without conflict.

In some embodiments, refinement subsystem 307 may monitor plan execution by actor 801 in order to track other resources in the planned path that actor 801 has accessed successfully (e.g., accessed per the timing set forth in the planned path) and next resource 803 for actor 801 to access in the planned path. Refinement subsystem 307 may obtain an identifier for the next resource from the path and/or plan, and may query database 311 using the identifier in order to determine the ordering, terminal position, timing, and/or other information for non-conflicting access of next resource 803.

Refinement subsystem 307 may query (at 804) database 311 using the identifier of actor 801. Based on the query (at 804), refinement subsystem 307 may obtain a last position, kinematics, telemetry, state, and/or other data (e.g., speed, angle, trajectory, height, etc.) that actor 801 has entered into database 311.

Refinement subsystem 307 may determine (at 806) a set of operations with which actor 801 may access next resource 803 while conforming to the timing, access ordering, and/or other constraints of the planned path. Determining (at 806) the set of operations may include comparing the data obtained for accessing next resource 803 with the data obtained for the current state of actor 801, and generating changes to the kinematics and/or telemetry of actor 801 and/or new actions so that actor 801 may access next resource 803 while conforming to the constraints of the planned path.

Refinement subsystem 307 may provide (at 808) the set of operations to actor 801. In some embodiments, the set of operations may directly change operational behavior of actor 801 by controlling actuators, motors, and/or other mechanical elements of a robot or other autonomous machine. In some other embodiments, refinement subsystem 307 may provide (at 808) the set of operations to a device that is next to or that is carried by a human worker, and the set of operations may identify a set of actions for the human worker to perform.

Refinement subsystem 307 may continue to monitor the activity of actor 801 based on updated information that actor 801 provides to database 311. From the updated data, refinement subsystem 307 may determine if actor 801 successfully performed the set of operations, and accessed next resource 803 according to the constraints defined for next resource 803 by navigation subsystem 303, augmentation subsystem 305, and/or other subsystems of modular planning system 105.

In the event that an actor 313 deviates from a planned path or fails to adhere to the constraints of the planned path, refinement subsystem 307 may modify affected parts of the plan in database 311. The modifications may serve as triggers for different subsystems of modular planning system 105 to update their respective parts of the plan, thereby avoiding a complete re-planning of a task if possible.

Figure 9:
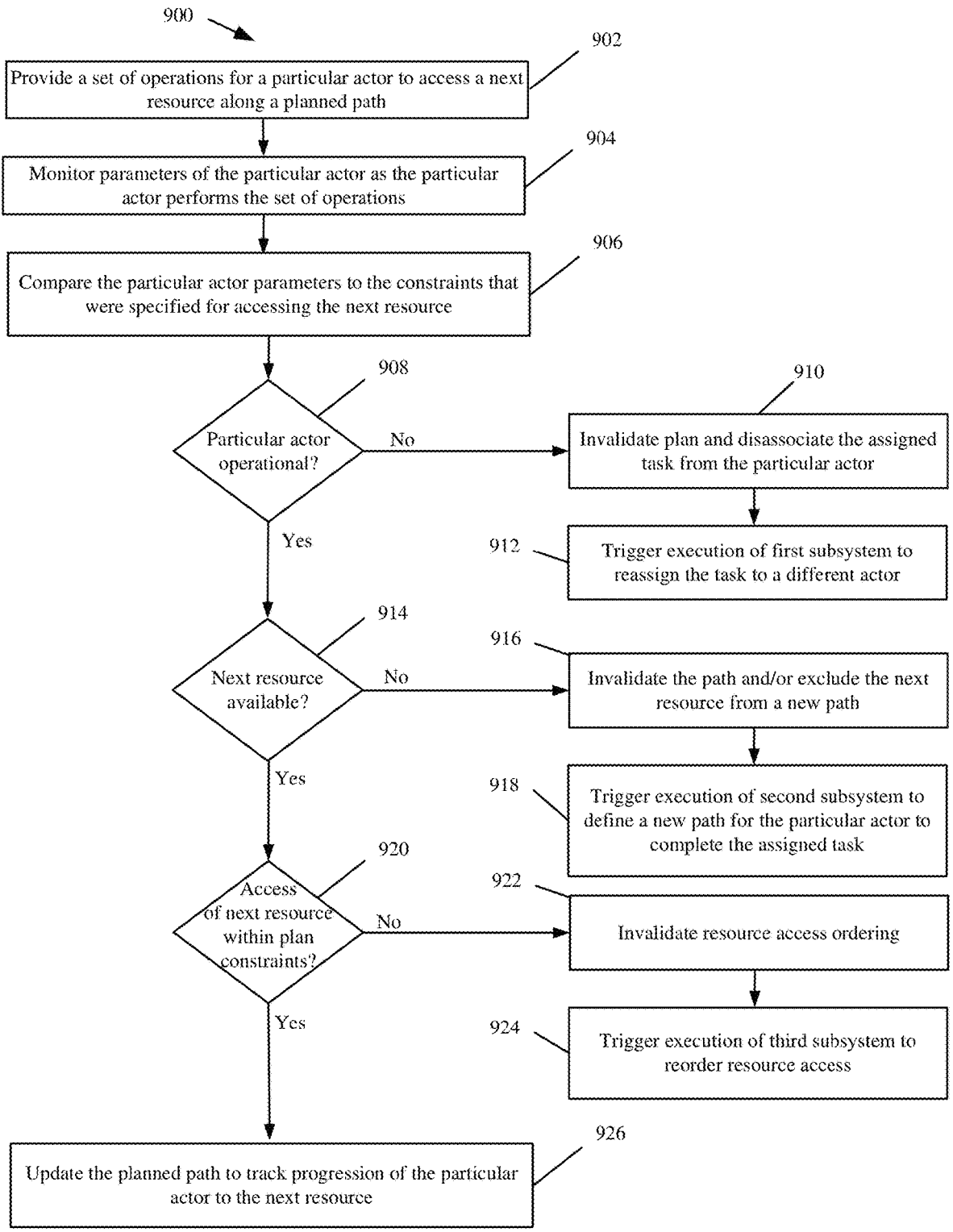
FIG. 9 present a process for modularly replacing different parts of a plan in accordance with some embodiments presented herein.

FIG. 9 present a process 900 for modularly replacing different parts of a plan in accordance with some embodiments presented herein. Process 900 may be performing by refinement subsystem 307.

Process 900 may include providing (at 902) a set of operations for a particular actor to access a next resource along a planned path. The set of operations may control or direct the particular actor in accessing the next resource. Providing (at 902) the set of operations may also include reserving the next resource for access by the particular actor. For instance, refinement subsystem 307 may lock the next resource to prevent other actors from accessing the next resource.

Process 900 may include monitoring (at 904) parameters of the particular actor as the particular actor performs the set of operations. The parameters may identify real-time positioning, kinematics, telemetry, and/or other performance data for the particular actor.

Process 900 may include comparing (at 906) the particular actor parameters to the constraints that were specified for accessing the next resource. Refinement subsystem 307 may perform the comparison (at 906) in order to determine whether the particular actor can successfully access the next resource while remaining within the specified constraints.

Accordingly, process 900 may include detecting (at 908) whether the particular actor is operational based on the comparison (at 906). Refinement subsystem 307 may detect (at 908) the operational state of the particular actor based on the updates that the particular actor provides to database 311.

In response to detecting (at 908—No) that the particular actor is not operational, process 900 may include invalidating (at 910) the plan entirely by disassociating the task from the particular actor in database 311. For instance, refinement subsystem 307 may detect (at 908) that the particular actor has been removed from service or has become unavailable while in the process of executing the plan as a result of failure, injury, and/or another issue. Consequently, refinement subsystem 307 may invalidate (at 910) the plan by removing the task that was assigned to the particular actor in the plan, and may reenter the task in a queue of pending tasks. Process 900 may include triggering (at 912) execution of scheduling subsystem 301 in response to invalidating (at 910) the plan and/or disassociating the task from any plans. Triggering (at 912) execution of scheduling subsystem 301 may cause scheduling subsystem 301 to initiate a new plan by reassigning the task to a different actor.

In response to detecting (at 908—Yes) that the particular actor is operational, process 900 may include detecting (at 914) availability of the next resource based on the comparison (at 906). The next resource may become unavailable as a result of depleted inventory, an item not being in an expected location (e.g., improper placement or storage), an obstacle that prevents the particular actor from accessing the next resource (e.g., a fallen or broken object that blocks access, a robot that has failed in the middle of a path, etc.), and/or other issues that prevent resource access.

In response to detecting (at 914—No) that the next resource is not available, process 900 may include invalidating (at 916) the path from the plan being executed by the particular actor. In some embodiments, refinement subsystem 307 may query database 311 in order to identify all plans with paths that include the next resource, and may invalidate (at 916) the paths of all such plans. In some embodiments, refinement subsystem 307 may temporarily flag, tag, and/or otherwise indicate that the next resource has become inaccessible and/or unavailable in database 311. For instance, refinement subsystem 307 may determine that the next resource cannot be accessed by the particular actor during execution of the plan, may determine the identifier for the next resource, and may generate an entry in database 311 using the next resource identifier. The entry may include an expiration time that indicates the next resource to be inaccessible for a period of time, and that prevents navigation subsystem 303 and/or augmentation subsystem 305 from including that resource as part of newly generated and/or modified paths for the period of time. Process 900 may include triggering (at 918) execution of navigation subsystem 303 in response to invalidating (at 916) the path. Triggering (at 918) execution of navigation subsystem 303 may cause navigation subsystem 303 to define and/or modify the path for the plan so that the path excludes or workarounds the next resource that is determined by refinement subsystem 307 to be inaccessible.

In response to detecting (at 914—Yes) that the next resource is available and/or accessible, process 900 may include detecting (at 920), based on the comparison (at 906) whether access of the next resource by the particular actor falls within timing, ordering, and/or other plan constraints. For instance, refinement subsystem 307 may detect, based on current positioning and/or kinematics of the particular actor, that the particular actor will be too early or late in accessing the next resource. Specifically, the expected access of the next resource by the particular actor will be outside the timing boundary that is specified in the plan and/or the path of the plan being executed by the particular actor.

In response to detecting (at 920—No) that access of the next resource by the particular actor does not satisfy the plan constraints, process 900 may include invaliding (at 922) the access ordering that was previously specified for the next resource by augmentation subsystem 305. In some embodiments, refinement subsystem 307 may request a reordering of actors accessing the next resource. In some embodiments, refinement subsystem 307 may use the identifier of the next resource to query database 311 for the access ordering that is currently specified for that resource, and may flag, tag, and/or otherwise indicate that the ordering is invalid. In some embodiments, refinement subsystem 307 may invalidate (at 922) the access ordering for the next resource and all other resources in the path following the next resource. Process 900 may include triggering (at 924) execution of augmentation subsystem 305 in response to invalidating (at 924) the access ordering for the next resource. Augmentation subsystem 305 may then specify a new ordering for the actors executing plans with paths that involve accessing the one or more resources with invalidated access orderings.

In response to detecting (at 920—Yes) the particular actor accessing the next resource within the specified plan constraints, process 900 may include updating (at 926) the planned path to track progression of the particular actor to the next resource. Updating (at 926) the planned path may include removing the next resource from the planned path and/or updating the access ordering for the next resource to indicate that access by the particular actor is complete, and that the next actor in the access ordering may access that resource.

Process 900 may continue along the planned path until all resources specified in the path are successfully accessed by the particular actor, and the task specified for the plan is complete. In particular, process 900 may include restarting with the resource that follows the last successfully accessed resource in the planned path.

In this manner, refinement subsystem 307 may control the selective replanning by causing different parts of different plans to be replaced by different subsystems of modular planning system 105. More specifically, refinement subsystem 307 may selectively invalidate different parts of a plan, such as the task-to-actor assignment, path definition, and/or resource access ordering, and may trigger different subsystems (e.g., scheduling subsystem 301, navigation subsystem 303, augmentation subsystem 305, etc.) to modularly replace a subset of the plan that has been invalidated without each and every subsystem of modular planning system 105 contributing to the replanning of the plan, and with different subsystems replacing different parts of different plans at the same time.

For instance, refinement subsystem 307 may invalidate the path definition of a first plan being executed by a first actor in response to resource unavailability, and may invalidate the access ordering for a resource of a second plan being executed by a different second actor in response to the timing of the second actor deviating from expected timing of the second plan. Consequently, navigation subsystem 303 may generate a new path for the first plan at the same time as augmentation subsystem 305 defines a new ordering with which one or more actors may access the resource specified in the second plan and/or other plans.

In some embodiments, refinement subsystem 307 may invalidate different parts of a plan, and may assign a priority value to that plan. The priority values may cause the other subsystems of modular planning system 105 to process the plans out-of-order and/or to contribute to the plans based on an order that is determined from the priority value of each plan. Using the priority values, refinement subsystem 307 may prioritize the replanning of tasks that are currently being executed by one or more actors 313 over the planning of tasks that will be executed sometime in the future or that await an assigned actor 313 to complete one or more other tasks. For instance, new plans for tasks that are to be performed one minute in the future may be assigned a priority value of 0, whereas plans that are currently being executed by one or more actors 313 may be assigned priority values between 1-5. A priority value of 5 may indicate that an actor 313 has stopped operation until the replanning is performed, and a priority value of 1 may indicate that an actor 313 has some buffered operations to complete before having to stop for a part of the plan that has to be replanned.

In some embodiments, modular planning system 105 may operate with a buffer to allow for replanning. For instance, modular planning system 105 may generate plans for tasks that the plurality of actors are to execute 10 seconds, 1 minute, or some time in the future. Accordingly, every actor may have at least one previously defined plan to execute while modular planning system 105 plans for future tasks. Should modular planning system 105 detect an issue during execution of a previously defined plan, the subsystems of modular planning system 105 may immediately replan parts of the previously defined plan that are affected by the issue without leaving any actors idle or without a plan to execute.

With reference back to FIG. 3, forwarding subsystem 309 may include the communication module by which modular planning system 105 interfaces with each actor 313. Forwarding subsystem 309 may establish a wired or wireless connection with actors 313. Forwarding subsystem 309 may directly connect to a wireless radio of autonomous devices such as robots, conveyor systems, lifts, transport vehicles, and the like, and may connect to a device that is on the person or near a human actor. For example, each human actor may have a wearable device for communicating with forwarding subsystem 309.

Forwarding subsystem 309 may query database 311 in order to identify new commands, instructions, and/or data to communicate to actors 313, thereby removing the communication overhead from subsystems 301-307, and allowing subsystems 301-307 to focus on their respective set of planning operations. In some embodiments, forwarding subsystem 309 may communicate with actors 313 as each subsystem contributes to a plan being executed by an actor. For instance, forwarding subsystem 309 may provide task assignments to actors 313 in order to identify a terminal destination, one or more objects to interact with at the terminal destination and/or task identifying information produced by scheduling subsystem 301, may provide the paths by which actors 313 are to complete the assigned tasks based on the contributions by navigation subsystem 303, may indicate the order by which actors 313 may access each of the allocated resources to minimize the potential for conflict based on the ordering that is defined by augmentation subsystem 305, and/or may direct the manner with which each actor accesses a resource in a planned path based on the commands and/or instructions provided by refinement subsystem 307.

Once a plan component is sent to an actor and/or the actor confirms receipt of that plan component, forwarding subsystem 309 may then update that plan component in database 311. In this manner, subsystems 301-307 may track progression and/or execution of the defined plans, and may make modular adjustments to the defined plans if necessary.

In some embodiments, forwarding subsystem 309 may communicate with actors 313 using Transmission Control Protocol ("TCP"), HyperText Transfer Protocol ("HTTP"), Quick User Datagram Protocol Internet Connections ("QUIC"), other networking protocols, and/or other messaging formats. Each actor 313 may register with modular planning system 105 when available for task execution. As part of registering with modular planning system 105, forwarding subsystem 309 may receive an Internet Protocol ("IP") address and/or another identifier for communicating with each actor 313 and/or a device of each actor 313.

Figure 10:
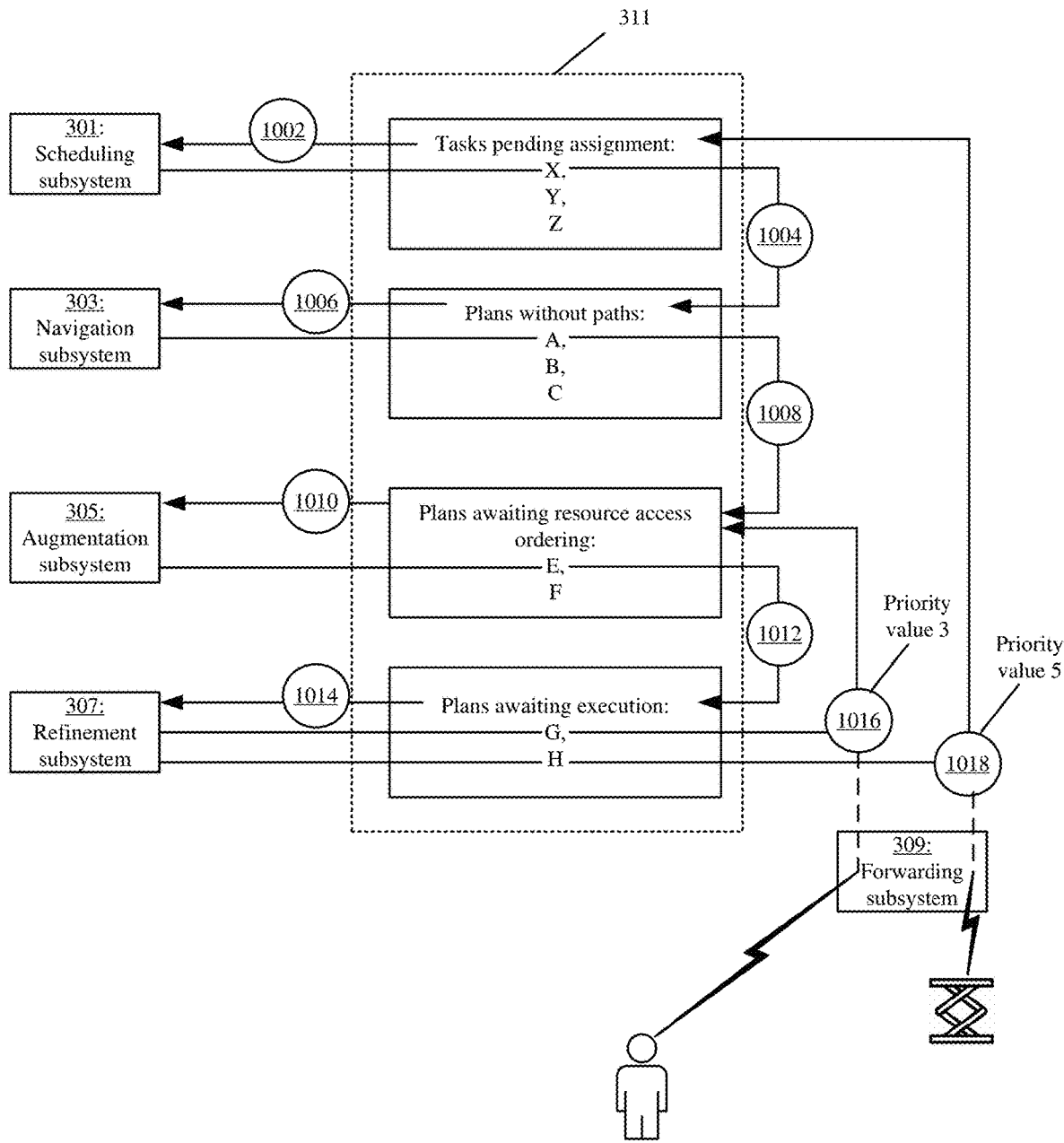
FIG. 10 illustrates an example for the overall modular and parallelized plan orchestration provided by the modular planning system in accordance with some embodiments presented herein.

FIG. 10 illustrates an example for the overall modular and parallelized plan orchestration provided by modular planning system 105 in accordance with some embodiments presented herein. As shown in FIG. 10, scheduling subsystem 301 may access (at 1002) database 311 in order to obtain a list of tasks pending assignment, and may create (at 1004) a first plan without a path for a first actor to execute by assigning a first task from the list of tasks to the first actor. As a result of creating (at 1004) the first plan without the path, the first plan may be added to a list of plans without paths in database 311. In some embodiments, multiple instances of scheduling subsystem 301 may execute to simultaneously assign different tasks to different actors.

At the same time, navigation subsystem 303 may access (at 1006) database 311 in order to obtain the list of plans without paths, and may generate (at 1008) a first path for a second plan in the list of plans without paths. The first path may specify a set of resources by which an actor assigned to the second plan may complete the task assigned to the second plan. As a result of generating (at 1008) the second plan with the first path, the second plan may be added to a list of plans awaiting resource access ordering. In some embodiments, multiple instances of navigation subsystem 303 may execute to simultaneously generate different paths for different plans.

At the same time, augmentation subsystem 305 may access (at 1010) database 311 in order to obtain the list of plans awaiting resource access ordering, and may provide (at 1012) an ordering by which a particular actor assigned to execute a third plan may access each resource specified in the path of the third plan. As a result of providing (at 1012) the resource access ordering for the third plan, the third plan may be added to a list of plans awaiting execution. In some embodiments, multiple instances of augmentation subsystem 305 may execute to simultaneously provide an ordering by which different actors may access resources of different plans.

At the same time, refinement subsystem 307 may access (at 1014) database 311 in order to obtain the list of plans awaiting execution, may provide operations from a set of the list of plans awaiting execution to different actors assigned to execute the tasks of those plans, and may track actor progression through the set of plans. In response to detecting (at 1016 and 1018) various issues, refinement subsystem 307 may invalidate different parts of different plans, and may assign large priority values to those plans, thereby causing different subsystems of modular planning system 105 to prioritize modifying or recontributing to those plans over other plans.

It should be noted that subsystems 301, 303, 305, 307, and 309 in FIG. 10 may perform their respective operations in parallel and/or at the same time. However, the rate at which scheduling subsystem 301 creates (at 1004) new plans by assigning tasks to different actors may differ from the rate at which navigation subsystem 303 generates (at 1008) paths for different plans.

In some embodiments, modular planning system 105 may use artificial intelligence and/or machine learning to improve the plan definition by better accounting for individual performance characteristics of each actor 313. For instance, modular planning system 105 may analyze the positioning, state, and/or other data provided by each actor 313 to database 311 over different time periods (e.g., hours of the day, days of the week, etc.). From the data, modular planning system 105 may adjust the performance characteristics of each actor 313, and may account for the adjusted performance characteristics with each subsystem 301-307 and part of the plan definition.

For instance, scheduling subsystem 301 may use the artificial intelligence and/or machine learning to determine that a first actor is faster at retrieving heavy or large objects than a second actor, and that performance of the second actor degrades after a particular time. Accordingly, scheduling subsystem 301 may assign a larger proportion of heavy or large object retrieval tasks to the first actor, and may assign a smaller proportion of heavy or large object retrieval tasks to the second actor. Additionally, scheduling subsystem 301 may reduce the number or rate of tasks that are assigned to the second actor after the particular time.

Navigation subsystem 303 may use artificial intelligence and/or machine learning to determine that congestion occurs with respect to accessing a first subset of resources during a first part of the day, and may determine that a first actor underperforms when accessing a second subset of resources. Accordingly, navigation subsystem 303 may limit the number of paths that are defined to include the first subset of resources during the first part of the day, and may prevent the first actor from accessing the second subset of resources if there is an alternative path or subset of resources that can be accessed to complete a task. The artificial intelligence and/or machine learning may therefore be used to continually adapt the operations being performed by the different subsystems, and to modify the resulting plan generation.

Figure 11:
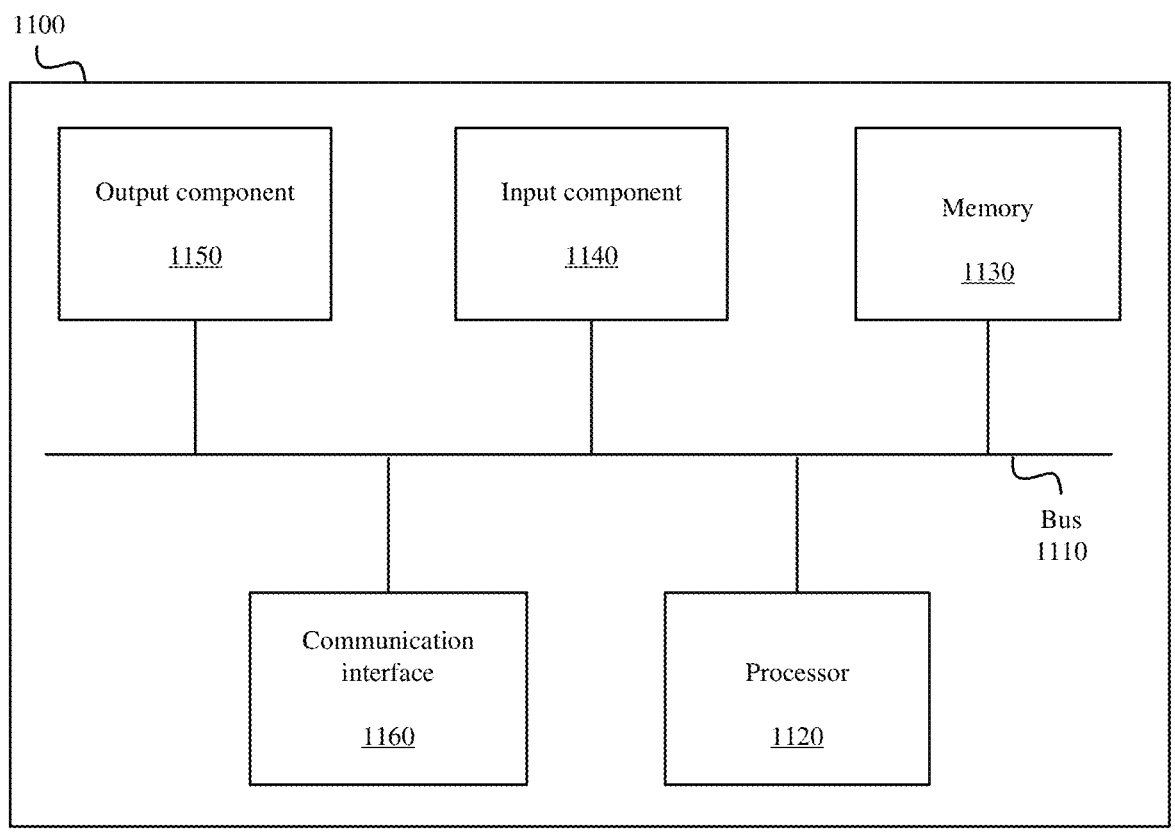
FIG. 11 illustrates example components of one or more devices, according to one or more embodiments described herein.

FIG. 11 is a diagram of example components of device 1100. Device 1100 may be used to implement one or more of the devices or systems described above (e.g., modular planning system 105, scheduling subsystem 301, navigation subsystem 303, augmentation subsystem 305, refinement subsystem 307, forwarding subsystem 309, database 311, etc.). Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method for automating control of a plurality of robots without conflict in a shared space, the method comprising:
   deploying a first robot, a second robot, a third robot, and a fourth robot in the shared space for execution of a plurality of tasks;
   programming the first robot, the second robot, the third robot, and the fourth robot for non-conflicting operation in the shared space by simultaneously defining different parts of a first plan for the first robot, a second plan for the second robot, a third plan for the third robot, and a fourth plan for the fourth robot via parallelized execution of a first subsystem of a plan generation system for a first modular part of the first plan, a second subsystem of the plan generation system for a distinct second modular part of the second plan, a third subsystem of the plan generation system for a distinct third modular part of the third plan, and a fourth subsystem of the plan generation system for a distinct fourth modular part of the fourth plan,
   wherein the parallelized execution of the first subsystem comprises associating a first task identifier of a first task to a first robot identifier of the first robot and a first plan identifier of the first plan at a first time by the first subsystem in response to receiving the first task and the first task not having been assigned to one of the plurality of robots for execution;
   wherein the parallelized execution of the second subsystem comprises defining a path for the second plan by the second subsystem at the first time in response to the second subsystem receiving the second plan from the first subsystem with a second task identifier for the second task associated to a second robot identifier of the second robot and a second plan identifier of the second plan and further in response to the second plan identifier of the second plan not being associated with any resource identifiers, wherein defining the path comprises associating a resource identifier for each resource of a first set of resources to the second plan identifier, the second robot identifier, and the second task identifier;
   wherein the parallelized execution of the third subsystem comprises determining an access ordering by which the third robot accesses a second set of resources that were previously allocated for a path of the third plan by the third subsystem at the first time in response to the third subsystem receiving the third plan with the second set of resources allocated by the second subsystem and without the access ordering determined for the second set of resources; and
   wherein the parallelized execution of the fourth subsystem comprises activating the fourth robot under remote control of the fourth subsystem at the first time in response to the fourth subsystem receiving the fourth plan as a fully defined plan from the third subsystem, wherein activating the fourth robot comprises moving the fourth robot and retrieving one or more objects in the shared space with actuators of the fourth robot according to an access ordering that was previously determined by the third subsystem for a third set of resources that were previously provided for a path by the second subsystem for the fourth plan that was previously associated with the fourth robot by the first subsystem;
   retrieving different objects from the shared space without conflict by the first robot, the second robot, the third robot, and the fourth robot based on the fourth robot operating according to the fourth plan, the third robot operating according to the third plan, the second robot operating according to the second plan, and the first robot operating according to the first plan as each plan is fully defined and received by the fourth subsystem;
   continuously monitoring kinematics of the first, second, third, and fourth robots during said retrieval of the different objects based on signaling exchanged between each robot and the fourth subsystem; and
   continuously updating different parts of one or more plans to preserve non-conflicting operation of the plurality of robots based on a comparison of the kinematics to each plan, wherein continuously updating the different parts comprises:
      detecting, by execution of the fourth subsystem at a second time, an error during retrieval of the different objects by the fourth robot;
      regenerating a first modular part of the fourth plan with the first subsystem assigning the fourth plan to a robot other than the fourth robot in response to the error corresponding to a failure of the fourth robot;
      changing a path by which the fourth robot moves in the shared space by replanning a second modular part of the fourth plan with the second subsystem in response to the error corresponding to one or more resources allocated to the path of the fourth plan becoming unavailable; and
      accessing the third set of resources with the fourth robot according to a new access ordering in response to the third subsystem replanning a third modular part of the fourth plan based on the error corresponding to a conflict with the access ordering of the fourth plan.

2. The method of claim 1 further comprising:
   contributing simultaneously to the different parts of each of the first, second, and third plans with the first, second, and third subsystems respectively based on the first subsystem associating the first robot to the first plan while the second subsystem defines the path for the second plan while the third subsystem determines the access ordering for the second set of resources of the third plan.

3. The method of claim 1 further comprising:
initiating execution of the first subsystem in response to receiving the first task and detecting that the first task identifier is not associated with any plan identifiers.

4. The method of claim 3 further comprising:
initiating execution of the second plan with the second subsystem in response to the first subsystem entering the second plan into a database without a path definition.

5. The method of claim 4 further comprising:
initiating execution of the third plan with the third subsystem in response to the second subsystem entering the third plan with the path comprising the second set of resources into the database and the second set of resources excluding an access ordering.

6. The method of claim 5 further comprising:
initiating execution of the fourth plan with the fourth subsystem in response to the third subsystem entering an access ordering for one or more of the third set of resources from the path of the fourth plan into the database.

7. The method of claim 1 further comprising:
invalidating, by operation of the fourth subsystem, a particular part of the fourth plan in response to detecting the error and determining a modular part of the fourth plan that is affected by the error.

8. The method of claim 7, wherein said invalidating comprises:
monitoring one or more of a position, kinematics, and telemetry of the fourth robot as part of said activating;
comparing one or more of the position, kinematics, and telemetry of the fourth robot to expected positioning and timing that is specified for accessing a resource in the path of the fourth plan; and
detecting a deviation from the fourth plan based on said comparing.

9. The method of claim 1, wherein accessing the third set of resources comprises:
replanning the third modular part of the fourth plan with the third subsystem without modifying other parts of the fourth plan using the first subsystem or the second subsystem.

10. The method of claim 1,
wherein one or more of the first, second, third, and fourth robots comprises an autonomous machine; and
wherein said retrieving comprises manipulating actuators of the autonomous machine with the fourth subsystem.

11. A system for automating control of a plurality of robots without conflict in a shared space, the system comprising:
a first robot, a second robot, a third robot, and a fourth robot in the shared space for execution of a plurality of tasks;
one or more hardware processors configured to:
program the first robot, the second robot, the third robot, and the fourth robot for non-conflicting operation in the shared space by simultaneously defining different parts of a first plan for the first robot, a second plan for the second robot, a third plan for the third robot, and a fourth plan for the fourth robot via parallelized execution of a first subsystem of a plan generation system for a first modular part of the first plan, a second subsystem of the plan generation system for a distinct second modular part of the second plan, a third subsystem of the plan generation system for a distinct third modular part of the third plan, and a fourth subsystem of the plan generation system for a distinct fourth modular part of the fourth plan,
wherein the parallelized execution of the first subsystem comprises associating a first task identifier of a first task to a first robot identifier of the first robot and a first plan identifier of the first plan at a first time by the first subsystem in response to receiving the first task and the first task not having been assigned to one of the plurality of robots for execution;
wherein the parallelized execution of the second subsystem comprises defining a path for a second plan by the second subsystem at the first time in response to the second subsystem receiving the second plan from the first subsystem with a second task identifier for the second task associated to a second robot identifier of the second robot and a second plan identifier of the second plan and further in response to the second plan identifier of the second plan not being associated with any resource identifiers, wherein defining the path comprises associating a resource identifier for each resource of a first set of resources to the second plan identifier, the second robot identifier, and the second task identifier;
wherein the parallelized execution of the third subsystem comprises determining an access ordering by which the accesses a second set of resources that were previously allocated for a path of the third plan by the third subsystem at the first time in response to the third subsystem receiving the third plan with the second set of resources allocated by the second subsystem and without the access ordering determined for the second set of resources; and
wherein the parallelized execution of the fourth subsystem comprises activating the fourth robot under remote control of the fourth subsystem at the first time in response to the fourth subsystem receiving the fourth plan as a fully defined plan from the third subsystem, wherein activating the fourth robot comprises moving the fourth robot and retrieving one or more objects in the shared space with actuators of the fourth robot according to an access ordering that was previously determined by the third subsystem for a third set of resources that were previously provided for a path by the second subsystem for the fourth plan that was previously associated with the fourth robot by the first subsystem;
retrieve different objects from the shared space without conflict by the first robot, the second robot, the third robot, and the fourth robot based on the fourth robot operating according to the fourth plan, the third robot operating according to the third plan, the second robot operating according to the second plan, and the first robot operating according to the first plan as each plan is fully defined and received by the fourth subsystem;
continuously monitor kinematics of the first, second, third, and fourth robots during said retrieval of the different objects based on signaling exchanged between each robot and the fourth subsystem; and continuously update different parts of one or more plans to preserve non-conflicting operation of the plurality of robots based on a comparison of the kinematics to each plan, wherein continuously updating the different parts comprises:

detecting, by execution of the fourth subsystem at a second time, an error during retrieval of the different objects by the fourth robot;

regenerating a first modular part of the fourth plan with the first subsystem assigning the fourth plan to a robot other than the fourth robot in response to the error corresponding to a failure of the fourth robot;

changing a path by which the fourth robot moves in the shared space by replanning a second modular part of the fourth plan with the second subsystem in response to the error corresponding to one or more resources allocated to the path of the fourth plan becoming unavailable; and accessing the third set of resources with the fourth robot according to a new access ordering in response to the third subsystem replanning a third modular part of the fourth plan in response to based on the error corresponding to a conflict with the access ordering of the fourth plan.

12. The system of claim 11, wherein each of the first, second, and third subsystems contribute simultaneously to the different parts of each of the first, second, and third plans respectively based on the first subsystem associating the first robot to the first plan while the second subsystem defines the path for the second plan while the third subsystem determines the access ordering for the second set of resources.

13. The system of claim 11 further comprising:
a database; and
wherein the second subsystem initiates execution of the second plan in response to the first subsystem entering the second plan into the database without a path definition.

14. The system of claim 13,
wherein the third subsystem initiates execution of the third plan in response to the second subsystem entering the third plan with the path comprising the second set of resources into the database and the second set of resources excluding an access ordering.

15. The system of claim 11, wherein the fourth subsystem is further configured to:
invalidate a particular part of the fourth plan in response to detecting the error and determining a modular part of the fourth plan that is affected by the error.

16. The system of claim 15, wherein invaliding the particular part comprises:
monitoring one or more of a position, kinematics, and telemetry of the fourth robot as part of said activating;
comparing one or more of the position, kinematics, and telemetry of the fourth robot to expected positioning and timing that is specified for accessing a resource in the path of the fourth plan; and
detecting a deviation from the path based on said comparing.

17. The method of claim 1, wherein activating the fourth robot comprises:
activating actuators of the fourth robot that change kinematics or telemetry of the fourth robot in conformance with constraints specified in the fourth plan for accessing the third set of resources.

\* \* \* \* \*